US011902339B1

(12) United States Patent
Param et al.

(10) Patent No.: US 11,902,339 B1
(45) Date of Patent: Feb. 13, 2024

(54) SYSTEMS FOR TRANSFERRING NETWORK APPLICATION SESSIONS

(71) Applicant: Amazon Technologies, Inc., Seattle, WA (US)

(72) Inventors: Arun Param, Coto De Caza, CA (US); Dave Banks, Lake Forest, CA (US); Raghunath Chirravuri, Long Beach, CA (US); Mustafa Hakim, Tustin, CA (US); Jared Haren, Lake Forest, CA (US); Yunjin Huang, Irvine, CA (US); Maaz Humayun, Bengaluru (IN); Anwar Karam, Lake Forest, CA (US); Salvatore Mitrano, Irvine, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/118,030

(22) Filed: Dec. 10, 2020

(51) Int. Cl.
*H04L 65/1083* (2022.01)
*H04L 67/306* (2022.01)
*A63F 13/30* (2014.01)
*H04L 65/1069* (2022.01)
*H04L 9/32* (2006.01)

(52) U.S. Cl.
CPC .......... *H04L 65/1083* (2013.01); *A63F 13/30* (2014.09); *H04L 9/3271* (2013.01); *H04L 65/1069* (2013.01); *H04L 67/306* (2013.01)

(58) Field of Classification Search
CPC ............. H04L 65/1083; H04L 65/1069; H04L 9/3271; H04L 67/306; A63F 13/30
See application file for complete search history.

(56) References Cited

U.S. PATENT DOCUMENTS

| 9,662,572 | B1* | 5/2017 | Laskar | A63F 13/92 |
| 2014/0351370 | A1* | 11/2014 | Ashley | H04L 67/148 709/217 |
| 2017/0072307 | A1* | 3/2017 | Perry | A63F 13/77 |
| 2019/0321732 | A1* | 10/2019 | Zimring | G06F 9/44568 |

* cited by examiner

*Primary Examiner* — James E Springer
*Assistant Examiner* — Patrick F Ngankam
(74) *Attorney, Agent, or Firm* — Lee & Hayes P.C.

(57) ABSTRACT

This disclosure describes, in part, techniques for transferring a session associated with an application between electronic devices. For instance, system(s) may receive, from a first electronic device, a first selection associated with the network application. The system(s) may then create the session for the network application and send, to the first electronic device, first content related to the session. Later, the system(s) may receive, from a second electronic device, a second selection associated with the network application. The system(s) may then determine that the session is still active for the first electronic device and transfer the session to being active for the second electronic device. As such, the system(s) may begin to send, to the second electronic device, second content related to the session. In some circumstances, the system(s) may also cause a control device to begin controlling the session that is now active for the second electronic device.

20 Claims, 12 Drawing Sheets

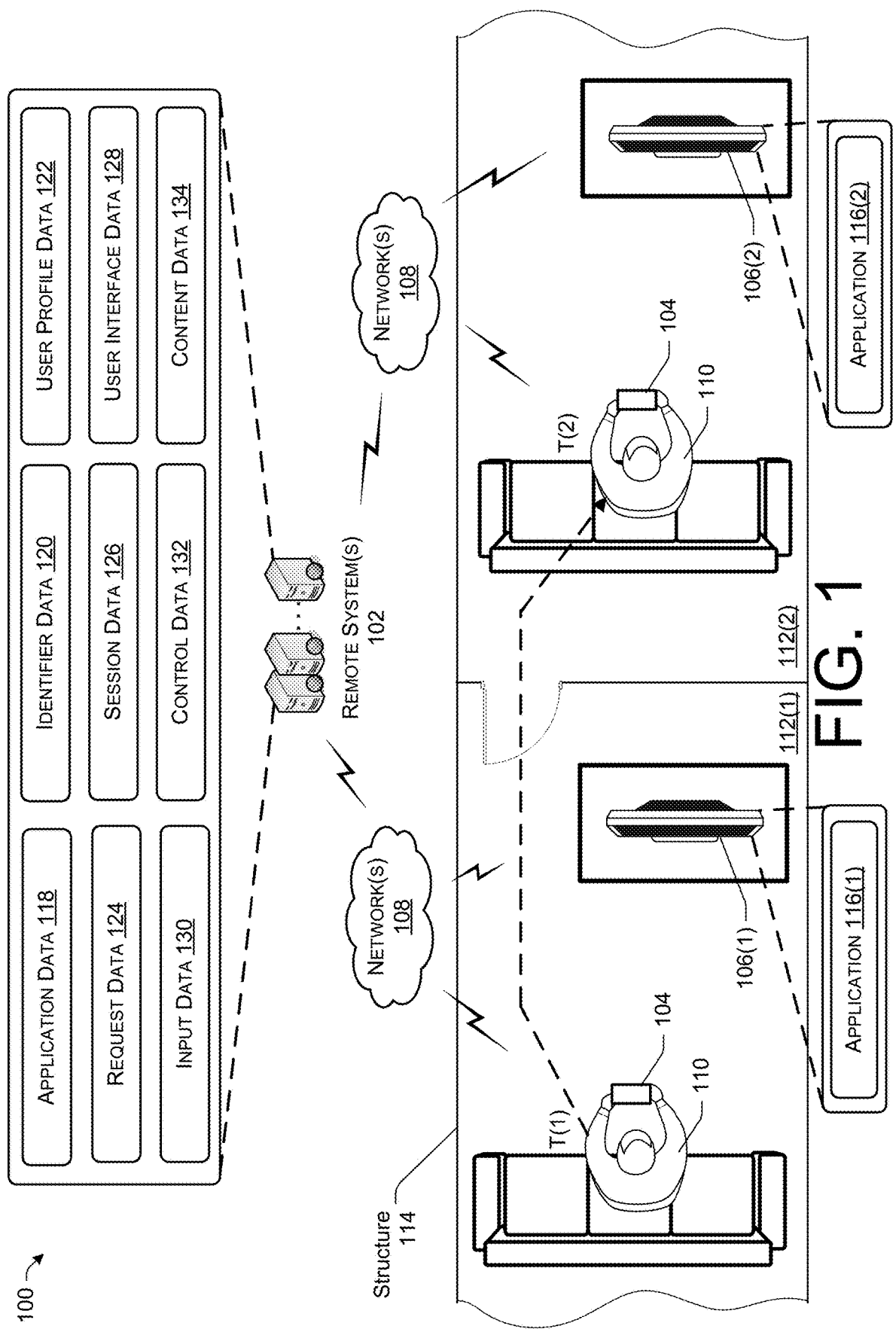

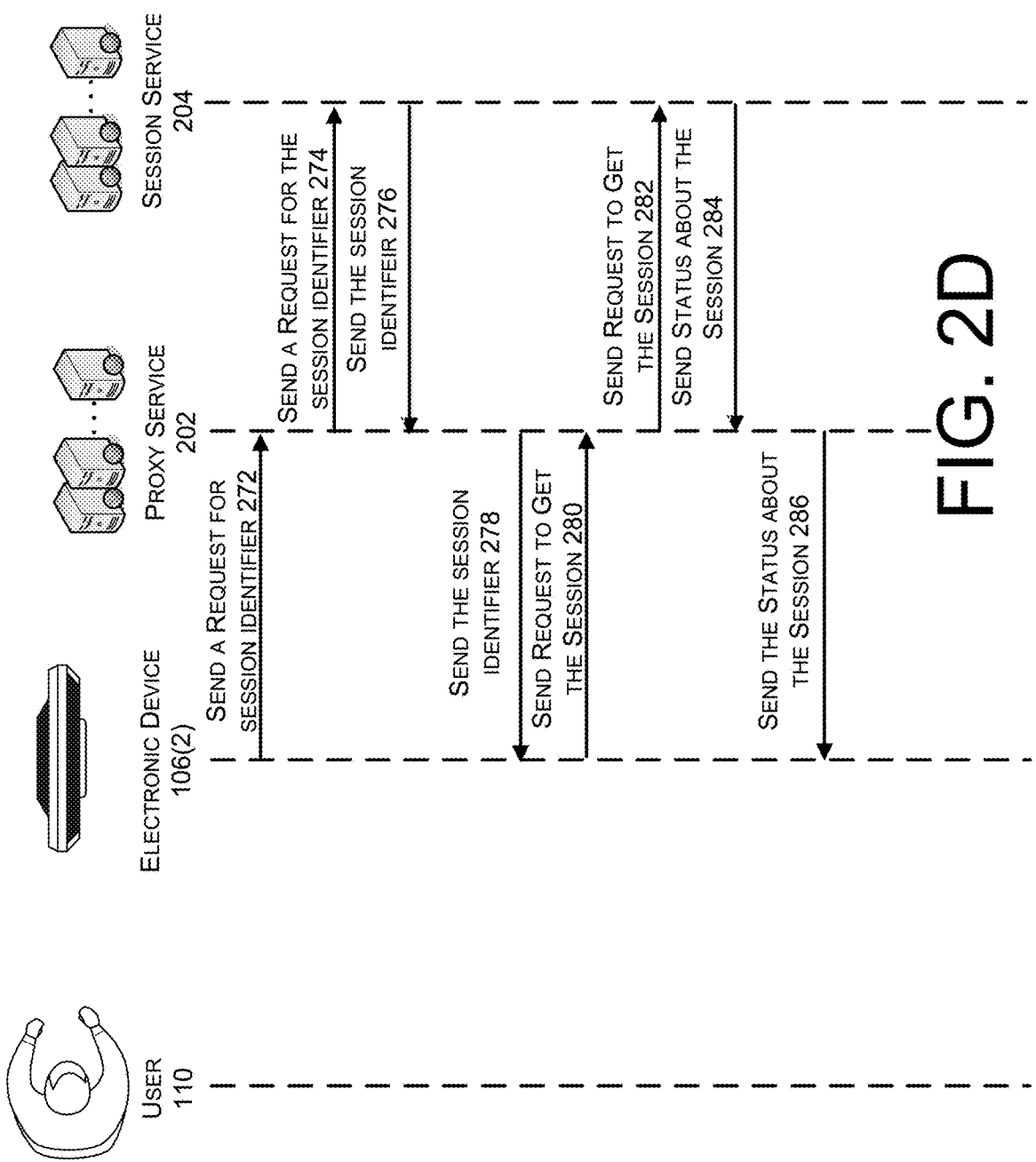

SYSTEMS FOR TRANSFERRING NETWORK APPLICATION SESSIONS

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller and update the state of the game based on the inputs. In some circumstances, the user may end a current gaming session for the game, such as by saving the game and turning off the video game console. The user can then later use the video game console to start a new gaming session for the game at a later time, where the new game session begins where the user last saved the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates a schematic diagram of an example system for transferring a session of a network application between electronic devices, in accordance with examples of the present disclosure.

FIGS. 2A-2E illustrate an example process for transferring a session of a network application from a first electronic device to a second electronic device, in accordance with examples of the present disclosure.

DETAILED DESCRIPTION

Figure 2A:
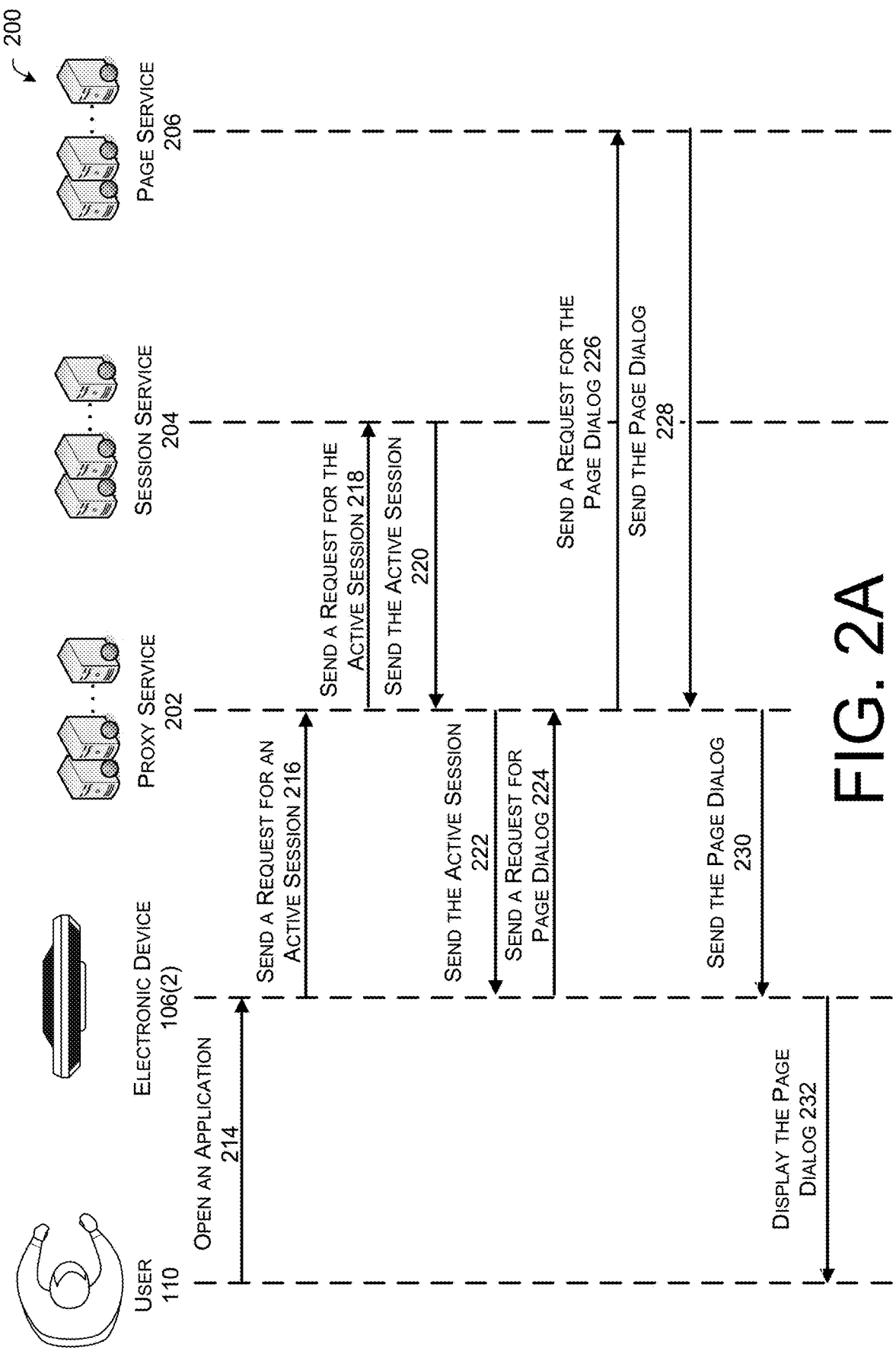
Figure 2B:
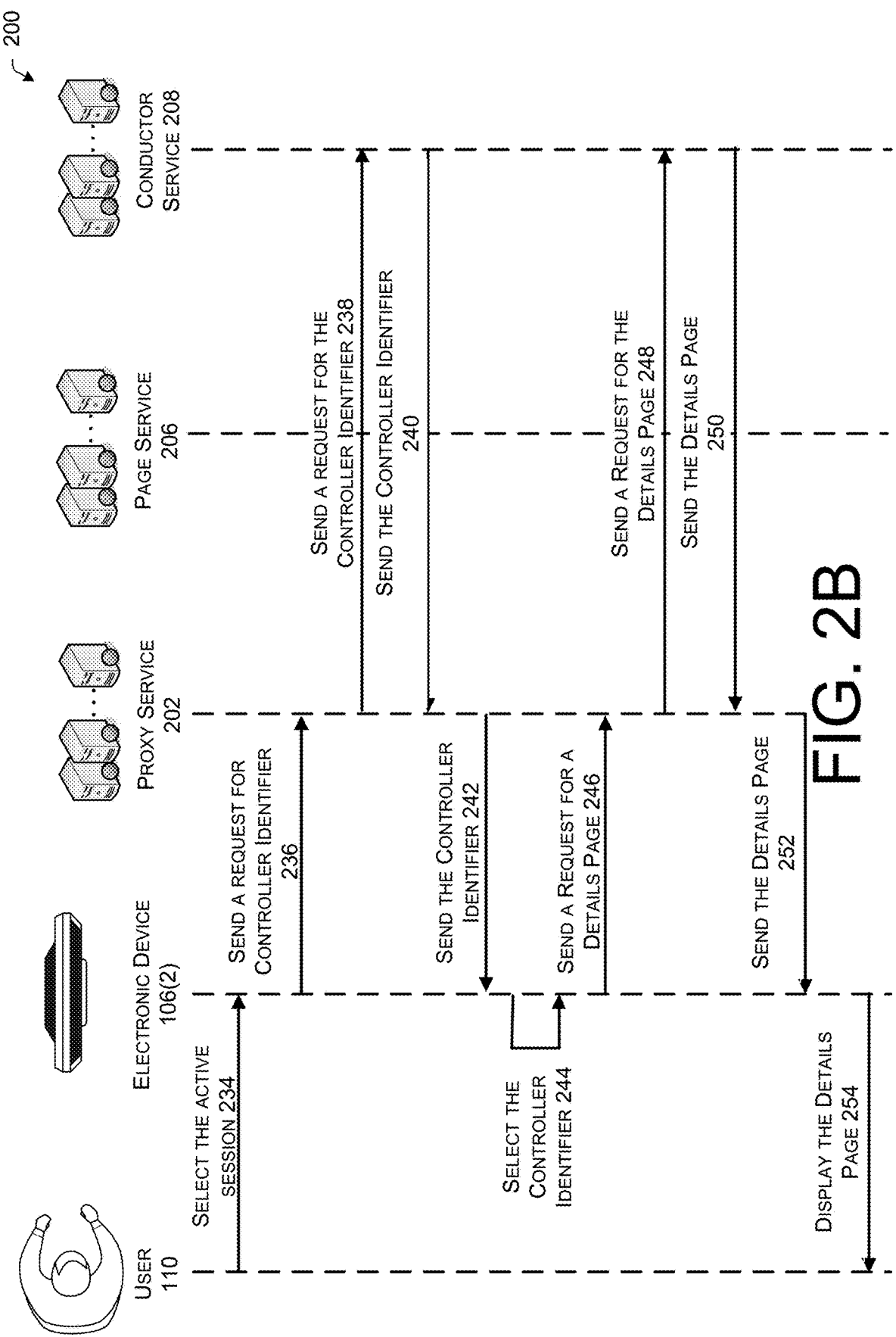
Figure 2C:
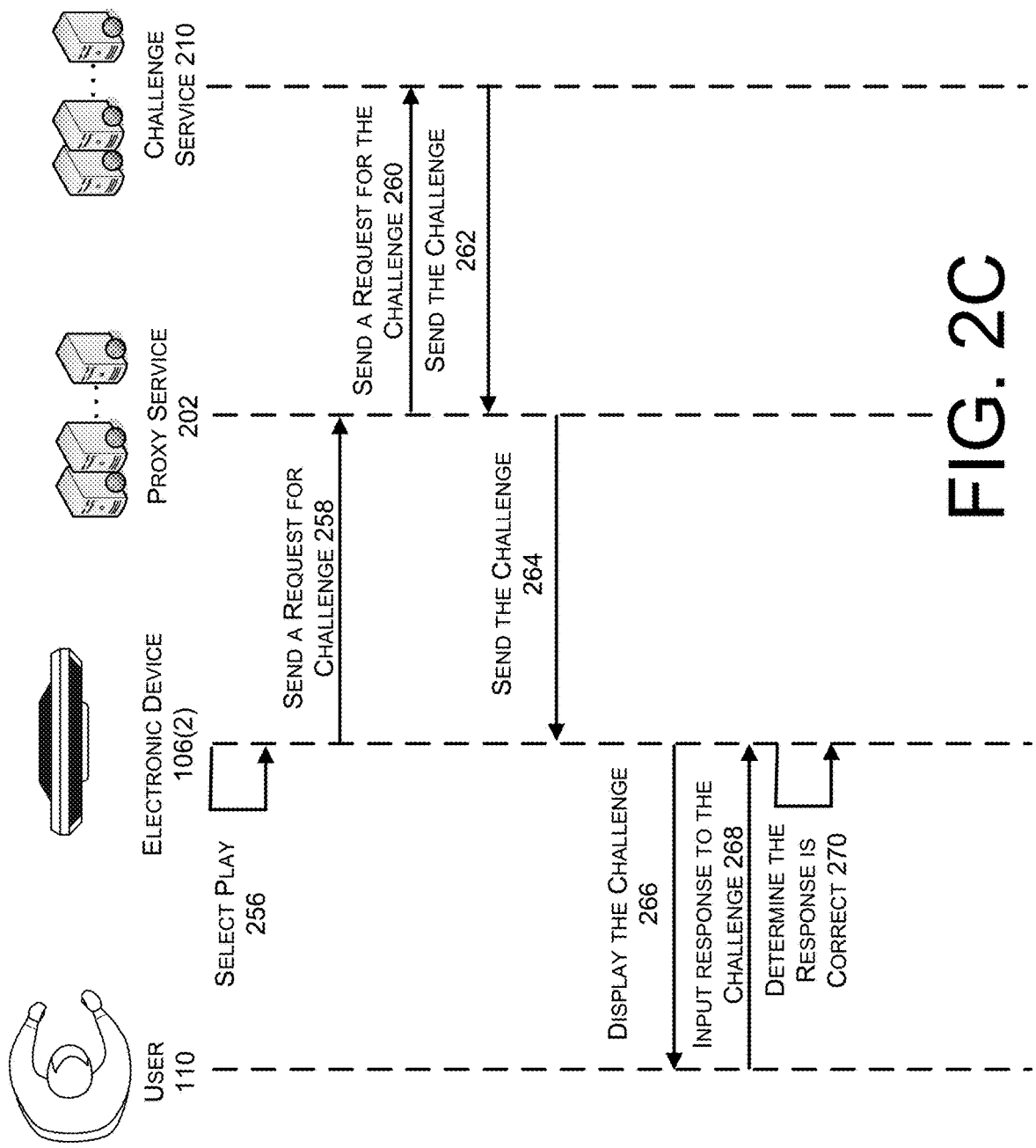
Figure 2E:
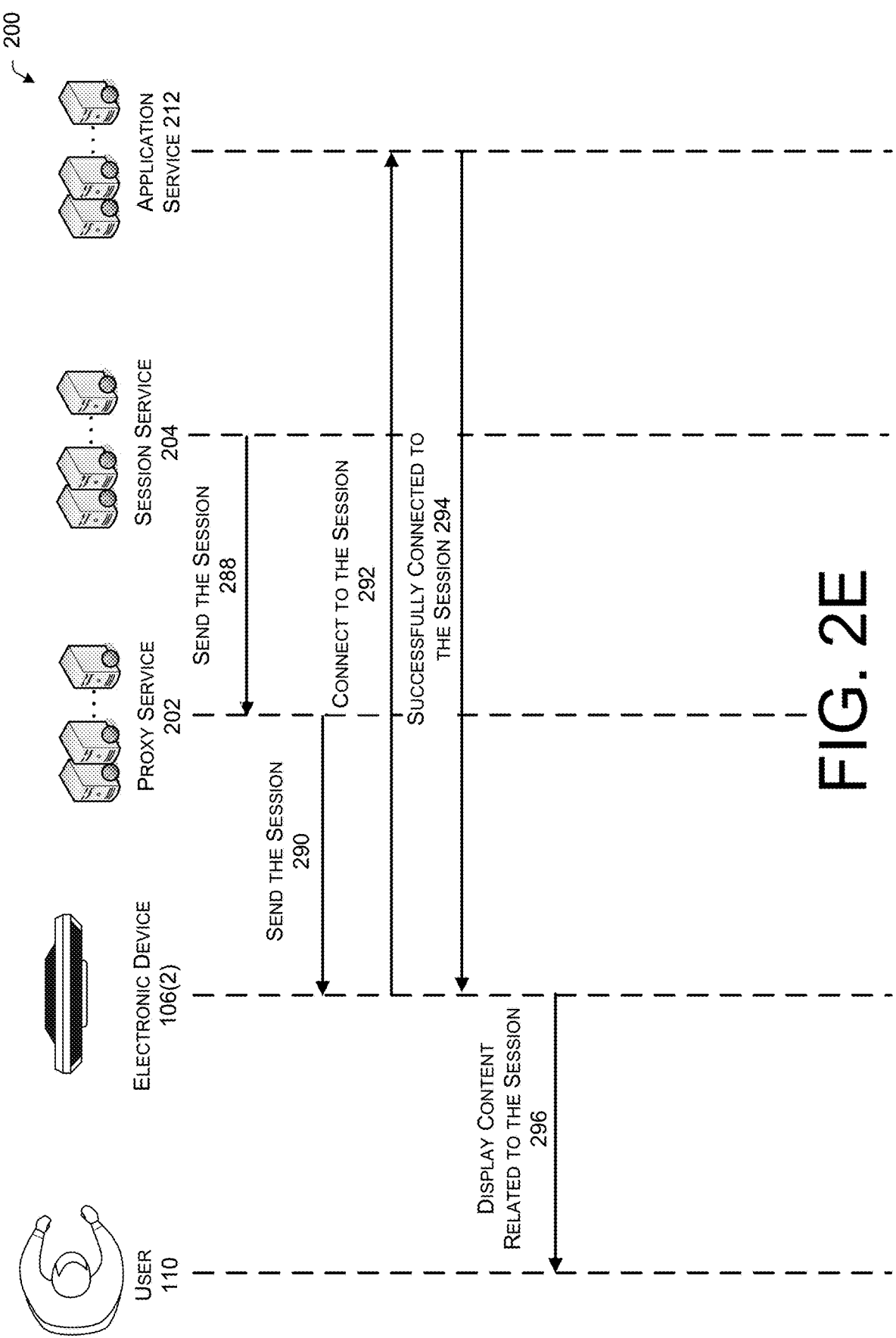

This disclosure describes, in part, systems and techniques for transferring a session between electronic devices. For instance, a user may use a first electronic device to control a network application, such as a gaming application. As such, system(s) may create a new session for the network application and send content data related to the session of the network application to the first electronic device. While the session is still activated for the first electronic device, the user may decide to use a second, different electronic device to control the network application. As such, the system(s) may determine that the session is still active for the first electronic device and transfer the session to the second electronic device. Based at least in part on the transfer, the system(s) may then begin to send the content data related to the session of the network application to the second electronic device.

For more detail, the user may initially use the first electronic device to begin the session for the network application. As described herein, an electronic device may include, but is not limited to, a television, a computer, a laptop, a mobile phone, a table, a voice-activated device, and/or any other type of device. To begin the session, the first electronic device may execute a first application that is associated with network applications. In some examples, the first electronic device begins executing the first application based on receiving an input to open the first application on the first electronic device. Additionally, or alternatively, in some examples, the first electronic device begins executing the first application based on receiving input indicating credentials (e.g., a username, a password, etc.) associated with a user profile. In either of the examples, the first electronic device may then begin communicating with the system(s).

The system(s) may store user profile data associated with the user profile. In some examples, the user profile data is associated with identifier(s) of electronic device(s) (e.g., the first electronic device, the second electronic device, etc.), identifier(s) of control device(s), network applications that are accessible by the user, the credentials, and/or the like. As described herein, an identifier of a device may include, but is not limited to, an Internet Protocol (IP) address, a media access control (MAC) address, a numerical identifier, an alphabetic identifier, a mixed numerical and alphabetic identifier, and/or any other type of identifier that may be used to identify the device.

When communicating with the first electronic device, the system(s) may receive, from the first electronic device, data associated with the first application and/or the user profile. The system(s) may then use the data to identify the user profile data. For a first example, the system(s) may determine that credentials represented by the data correspond to (e.g., match) the credentials represented by and/or associated with the user profile data. For a second example, the system(s) may determine that an identifier represented by the data (e.g., an identifier of the first electronic device) corresponds to (e.g., matches) the identifier represented by and/or associated with the user profile data. In either of the examples, the system(s) may use the determination to identify the user profile data.

The system(s) may also receive, from the first electronic device, data that identifies the network application. For example, the data may represent an identifier, such as a name, a number, a code, and/or other type of identifier, that identifies the network application. Based on receiving the data that identifies the network application, the system(s) may initially determine whether there is a current session activate for the network application. In some examples, the system(s) make the determination by sending, to one or more first devices associated with a session service, data representing a request for active sessions. The system(s) may then receive, from the first device(s), data indicating whether there is a current active session for the network application. In this example, the system(s) may determine that there is not a current active session for the network application. As such, the system(s) may determine to create a new session for the network application.

Based on creating the session, the system(s) then cause the session to be associated with the first application and/or the first electronic device. In some examples, the system(s) create the association(s) by sending, to the first device(s), data indicating that the session has been created. The first device(s) may then store data that associates the session with the first application and/or the first electronic device. For example, the data may at least identify the session and identify the first application and/or the first electronic device. The system(s) may also cause a control device to be associated with the first application and/or the first electronic device.

In some examples, the system(s) create the association(s) by sending, to one or more second devices associated with a conductor service, data indicating that the control device is to be used to control the session. The second device(s) may then store data that associates the control device with the session, the first application, and/or the first electronic device. For example, the data may at least identify the control device (e.g., include an identifier associated with the control device) and identify the session, the first application, and/or the first electronic device. In some examples, the system(s) may also send, to the control device, data that configures the control device to control the session and/or the first electronic device.

While the session is active for the first application and/or the first electronic device, the user may then use the control device to control the session of the network application that is being displayed via the first electronic device. For instance, the system(s) may then begin receiving data representing inputs received by the control device. In some examples, the system(s) receive the data each time the control device receives an input. In some examples, the system(s) receive the data at given time intervals (e.g., every millisecond, ten milliseconds, second, etc.). In either of the examples, the system(s) use the data to update the state of the network application based on the input(s) being received by the control device. The system(s) may then send data representing the states of the network application to the first electronic device.

For instance, the system(s) may send, to the first electronic device, data (e.g., video data, audio data, etc.) representing a first state of the network application. For example, if the network application includes a gaming application, the first state of the network application may include an object (e.g., a character) located at a first position within a gaming environment (e.g., a forest). The first electronic device may receive the data from the system(s) and, using the data, the first electronic device may display image(s) representing the first state of the network application. For example, and again if the network application includes the gaming application, the first electronic device may display content representing the object located at the first position within the gaming environment. In some instances, the first electronic device may further output sound represented by the audio data. The user may then use the control device to provide inputs to the network application via the system(s).

For instance, the control device may receive an input, such as a selection of a button, joystick, key, touch-sensitive pad, sensor, and/or the like associated with the control device. The control device may then send, to the system(s), data representing the input. Using the data, the system(s) may update the first state of the application to a second state of the application. For example, and again if the network application includes the gaming application, the input may be associated with moving the object forward by a given amount within the gaming environment. As such, the system(s) may update the first state of the of the application to the second state of the application by moving the object forward in the environment by the given amount.

The system(s) may then send, to the first electronic device, data (e.g., video data, audio data, etc.) representing the second state of the application. Using the data, the first electronic device may display image(s) representing the second state of the game. For example, the first electronic device may display content representing the object located at the second position within the gaming environment. Additionally, in some instances, the first electronic device may output sound represented by the audio data. The system(s) may then continue to perform similar processes to update the state of the network application on the first electronic device as the system(s) continues to receive data from the control device.

While the session is still active for the first application and/or the first electronic device, the user may decide to use the second electronic device to continue the session. To continue the session, the second electronic device may execute a second application (which may be similar to, and/or related to, the first application) that is associated with the network applications. In some examples, the second electronic device begins executing the second application based on receiving an input to open the second application on the second electronic device. Additionally, or alternatively, in some examples, the second electronic device begins executing the second application based on receiving input indicating the credentials (e.g., the username, the password, etc.) associated with the user profile. In either of the examples, the second electronic device may then begin communicating with the system(s).

When communicating with the second electronic device, the system(s) may receive, from the second electronic device, data associated with the second application and/or the user profile. The system(s) may use the data to identify the user profile data, using similar processes as those discussed above. The system(s) may also receive, from the second electronic device, data that identifies the network application. Based on receiving the data that identifies the network application, the system(s) may initially determine whether there is a current session that is active for the network application and associated with the user profile. In some examples, the system(s) make the determination by sending, to the first device(s), data representing a request for active sessions. The system(s) may then receive, from the first device(s), data indicating whether there is a current active session for the network application. In this example, the system(s) may determine that the session is currently active and associated with the user profile.

In some examples, the session may still be active for the first electronic device based on the system(s) (e.g., an application service) still sending data associated with the session to the first electronic device. For example, the session may still be active for the first electronic device based on the system(s) continuing to stream the data to the first electronic device. In some examples, the session may still be active for the first electronic device based on the first electronic device still executing the first application associated with the network application. Still, in some examples, the session may still be active for the first electronic device based on the session being associated with the first application and/or the first electronic device.

Based on determining that the session is still active for the first electronic device, the system(s) may send, to the second electronic device, data representing a user interface. The user interface may include at least an indication that the session is still active for another electronic device (e.g., the first electronic device), a first interface element for transferring the session to be active for the second electronic device, and a second interface element for canceling the transfer of the session. In some examples, the system(s) generate and/or receive the user interface using one or more third devices associated with a dialog service. The second electronic device may receive the data from the system(s) and use the data to display the user interface to the user. While the second electronic device is displaying the user interface, the system(s) may receive, from the second electronic device, the control device, and/or another device, data representing a selection of the first interface element. Based on the data, the system(s) may determine to transfer the session to be active for the second electronic device.

To transfer the session, the system(s) may send, to the second electronic device, data associated with the session (an identifier of the session, content related to the session, etc.). The system(s) may also cause the session to be associated with the session, the second application, and/or the second electronic device. In some examples, the system(s) create the association(s) by sending, to the first device(s), data indicating that the session has been transferred to the second electronic device. The first device(s) may then store data that associates the session with the second application and/or the second electronic device. For example, the data may at least identify the session and identify the second application and/or the second electronic device.

Additionally, in some examples, the system(s) may terminate the session that is activate for the first electronic device. For example, the system(s) may terminate the session by no longer sending the data associated with the network application to the first electronic device. Additionally, in some examples, and since the session is terminated for the first electronic device, the first device(s) may remove the data that associates the session with the first application and/or the first electronic device. In some examples, the first device(s) may automatically remove the data when the first device(s) create the new association(s) between the session and the second application and/or the second electronic device.

Additionally, in some examples, the system(s) may determine that the control device is associated with the session that was activate for the first application and/or the first electronic device. For example, the system(s) may send, to the second device(s), data representing a request to get information related to control device(s) that are associated with the session and/or the first electronic device. The system(s) may then receive, from the second device(s), data that identifies the control device. In some examples, the system(s) send, to the second electronic device, data representing a user interface that includes at least an indication that the control device is controlling the session that was active on the first electronic device and an interface element for causing the control device to transfer to controlling the session that is now active for the second electronic device. In such examples, the system(s) may then receive, from the second electronic device, the control device, and/or another device, data indicating a selection of the interface element.

As such, the system(s) may determine to cause the control device to begin controlling the session that is now active for the second application and/or the second electronic device. In some example, the system(s) cause the control device to begin controlling the session that is active for the second application and/or the second electronic device by sending, to the control device, data that configures the control device to control the session associated with the second application and/or the second electronic device. The system(s) may also cause the control device to be associated with the second application and/or the second electronic device. In some examples, the system(s) create the association(s) by sending, to the second device(s), data indicating that the control device is to be used to control the session that is now active for the second application and/or second electronic device. The second device(s) may then store data that associates the control device with the second application and/or the second electronic device. For example, the data may at least identify the control device (e.g., include the identifier associated with the control device) and identify the session, the second application, and/or the second electronic device.

While the session is active for the second electronic device, the user may then use the control device to control the network application that is being displayed via the second electronic device. For instance, the system(s) may begin receiving data representing inputs received by the control device. In some examples, the system(s) receive the data each time the control device receives an input. In some examples, the system(s) receive the data at given time intervals (e.g., every millisecond, ten milliseconds, second, etc.). In either of the examples, the system(s) use the data to update the state of the network application based on the input(s) being received by the control device. The system(s) may then send data representing the states of the network application to the second electronic device.

For instance, and continuing with the example above, the system(s) may send, to the second electronic device, data (e.g., video data, audio data, etc.) representing a third state of the network application. For example, if the network application includes the gaming application, the third state of the network application may include the object located at a third position within the gaming environment (e.g., a house). The second electronic device may receive the data from system(s) and, using the data, the second electronic device may display image(s) representing the third state of the network application. For example, and again if the network application includes the gaming application, the second electronic device may display content representing the object located at the third position within the gaming environment. In some instances, the second electronic device may further output sound represented by the audio data. The user may then use the control device to provide inputs to the network application via the system(s).

For instance, the control device may receive an input, such as a selection of a button, joystick, key, touch-sensitive pad, sensor, and/or the like associated with the control device. The control device may then send, to the system(s), data representing the input. Using the data, the system(s) may update the third state of the application to a fourth state of the application. For example, and again if the network application includes the gaming application, the input may be associated with moving the object sideways by a given amount within the gaming environment. As such, the system(s) may update the third state of the of the application to the fourth state of the application by moving the object sideways in the environment by the given amount.

The system(s) may then send, to the second electronic device, data (e.g., video data, audio data, etc.) representing the fourth state of the application. Using the data, the second electronic device may display image(s) representing the fourth state of the game. For example, the second electronic device may display content representing the object located at the fourth position within the gaming environment. Additionally, in some instances, the second electronic device may further output sound represented by the audio data. The system(s) may then continue to perform similar processes to update the state of the network application on the second electronic device as the system(s) continues to receive data from the control device.

The system(s) may continue to perform the processes described above in order to continue to transfer the session between electronic devices as long as the session remains active. In some examples, the system(s) may continue to keep the session activate until receiving data representing an input to end the session, an application that is currently associated with the session is closed on an electronic device, a new network application is selected, a new application is opened on the electronic device, the electronic device is turned off, the system(s) lose a network connection with the electronic device, and/or the like. Performing one of these processes may cause the session associated with the network application to be terminated. As such, the system(s) may need to create a new session for the network application the next time that the user uses an electronic device to access the network application.

It should be noted that, while the examples above describe the system(s) transferring the session to the second electronic device, in other examples, the system(s) may determine not to transfer the session. For example, a third electronic device may execute a third application (which may be similar to, and/or related to, the first application and/or the second application) that is associated with the network applications. The third electronic device may then begin communicating with the system(s). When communicating with the third electronic device, the system(s) may receive, from the third electronic device, data associated with the third application and/or the user profile. The system(s) may then use the data to identify the user profile data, using similar processes as those discussed above. The system(s) may also receive, from the third electronic device, data that identifies the network application. Based on receiving the data that identifies the network application, the system(s) may initially determine that there is a current session that is active for the network application and associated with the user profile.

Based on determining that the session is still active for the second electronic device, the system(s) may send, to the third electronic device, data representing a user interface. The user interface may include at least an indication that the session is still active for another electronic device (e.g., the second electronic device), a first interface element for transferring the session to be active for the third electronic device, and a second interface element for canceling the transfer of the session. In this example, the system(s) may receive, from the control device and/or the third electronic device, data representing an input of the second interface element. In other words, the user may not want to transfer the session to the third electronic device.

In some examples, based on the input, the system(s) may send, to the third electronic device, data representing a new user interface that includes one or more other network applications. For instance, the new user interface may correspond to a "home" screen that includes network applications for selection by users. Additionally, in some examples, the system(s) may perform one or more of the processes described above in order to associate the control device with the third electronic device and/or the third application. This way, the user is now able to control the content that is being displayed by the third electronic device.

In some examples, the user may then select a new network application. As such, the system(s) may perform one or more of the processes described above to create a new session for the new network application and associate the new session with the third electronic device and/or the third application. Additionally, in some examples, the system(s) may terminate the active session for the network application that is associated with the second electronic device and/or the second application. In these examples, this may be because the system(s) only allow one session for one network application to be activate for the user profile at a single instance. However, in other examples, the system(s) may not terminate the session for the network application.

Additionally, while the examples above describe transferring a session between electronic devices for a single user, in other examples, the system(s) may use similar processes to transfer the session between electronic devices for different users. For example, the system(s) may receive, from a third electronic device, data associated with an additional user profile. The system(s) may also receive, from the second electronic device and/or the third electronic device, data representing a request to transfer the session to the third electronic device. Based on the request, the system(s) may transfer the session from being activate for the second electronic device and/or the user profile to being activate for the third electronic device and/or the additional user profile. This way, different users are able to play the same session of the network application by transferring the session between one another.

It should be noted that, while the examples above describe the first device(s) and the second device(s) as being separate from the system(s), in other examples, the first device(s) and/or the second device(s) may be part of the system(s). Additionally, in some examples, the electronic devices may begin to communicate with one or more third devices that are associated with the application service after the session is created and active for the electronic devices. In other words, the third device(s) may be separate from the system(s).

By performing the processes described herein, the system(s) are able to transfer an active session associated with a network application, such as a gaming application, between different electronic devices. This provides the user with the ability to begin the session using a first electronic device and then continue, without ending the session, the session using the second electronic device. In some instances, this may provide improvements to system(s) that provide network applications, such as gaming applications, to users. For example, the system(s) may not be required to terminate and then create sessions each time a user switches between electronic devices. Additionally, the system(s) may not be required to save data associated with the sessions each time the user terminates a session to switch to a different electronic device.

FIG. 1 illustrates a schematic diagram of an example system 100 for transferring sessions of network applications between electronic devices, in accordance with examples of the present disclosure. The system 100 may include, for example, remote system(s) 102, a control device 104, and electronic devices 106(1)-(2) (also referred to as "electronic devices 106"). In the example of FIG. 1, the control device 104 may communicate with the remote system(s) 102 over network(s) 108, such as by using a communication channel. For instance, the control device 104 may send data to the remote system(s) 102 and the remote system(s) 102 may send data to the control device 104. Additionally, the electronic devices 106 may communicate with the remote system(s) 102 over the network(s) 108, such as by using communication channels. For instance, the electronic devices 106 may send data to the remote system(s) 102 and the remote system(s) 102 may send data to the electronic devices 106.

In the example of FIG. 1, and at a first time T(1), a user 110 may be located within a first portion 112(1) (e.g., a first room) of a structure 114 (e.g. house) and using the first electronic device 106(1). For instance, the first electronic device 106(1) may launch a first application 116(1) that is associated with network application(s) provided by the remote system(s) 102, wherein the network applications are represented by application data 118. As described herein, a network application may include, but is not limited to, a gaming application, a word processing application, an educational application, a multimedia application (e.g., movie, music, etc.), and/or any other application that is capable of being accessed via the network(s) 108.

The remote system(s) 102 may then receive, from the first electronic device 106(1), first identifier data 120 that identifies a user profile associated with the user 110 and/or the first electronic device 106(1). The remote system(s) 102 may then use the first identifier data 120 to identify the first electronic device 106(1) and/or the user profile. For a first example, the remote system(s) 102 may determine that credentials represented by the first identifier data 120 correspond to (e.g., match) credentials associated with the user profile, where the user profile is represented by the user profile data 122. For a second example, the remote system(s) 102 may determine that an identifier represented by the first identifier data 120 corresponds to (e.g., matches) an identifier associated with the user profile, where the identifier is associated with the first electronic device 106(1). In either of the examples, the remote system(s) 102 may use the determination to identify the user profile and/or the first electronic device 106(1).

The remote system(s) 102 may also receive, from the first electronic device 106(1), first request data 124 that represents a request to launch a network application. For example, the first request data 124 may represent an identifier of the network application that is selected by the user 110. As described herein, an identifier associated with a network application may include, but is not limited to, a name, a number, a code, and/or any other type of identifier that the remote system(s) 102 may use to identify the network application. For example, the remote system(s) 102 may determine that the identifier represented by the first request data 124 corresponds to (e.g., matches) an identifier represented by the application data 118, where the identifier represented by the application data 118 is associated with the network application. The remote system(s) 102 may then determine whether there is a current active session of the network application. As described in more detail below, the remote system(s) 102 may determine whether there is a current active session using a session service. In the example of FIG. 1, the remote system(s) 102 may determine that there is not a current active session at the first time.

As such, the remote system(s) 102 may launch the network application and create a new session for the user 110. The remote system(s) 102 may then associate the session with the first application 116(1) and/or the first electronic device 106(1). For a first example, the remote system(s) 102 may generate and then store first session data 126, where the first session data 126 associates the session with the first application 116(1) and/or the first electronic device 106(1). For a second example, and as described in more detail below, the remote system(s) 102 may cause a session service to generate and store the first session data 126. In some examples, the first session data 126 may represent at least an identifier associated with the session and identifier(s) associated with the first application 116(1) and/or the first electronic device 106(1). As such, the remote system(s) 102 and/or the session service may be able to analyze the first session data 126 in order to determine that there is an active session for the network application for the first application 116(1) and/or the first electronic device 106(1).

The remote system(s) 102 may also associate the control device 104 with the session, the first application 116(1), and/or the first electronic device 106(1). For example, the remote system(s) 102 may use the user profile data 122 in order to identify the control device 104. In some examples, the remote system(s) 102 identifies the control device 104 based on the user profile data 122 representing an identifier associated with the control device 104. In some examples, the remote system(s) 102 may then automatically associate the control device 104 with the session, the first application 116(1), and/or the first electronic device 106(1). In other examples, the remote system(s) 102 may initially request whether the user 110 wants to associate the control device 104 with the session, the first application 116(1), and/or the first electronic device 106(1).

For example, the remote system(s) 102 may send, to the first electronic device 106(1), first user interface data 128 representing a first user interface. In some instances, the remote system(s) 102 generate the first user interface data 128 while in other examples, and as discussed in more detail below, the remote system(s) 102 receive the first user interface data 128 from a page service. The first user interface may include at least an indication of the control device 104 (e.g., an identifier, such as a name, of the control device 104) and an interface element for associating the control device 104 with the first application 116(1) and/or the first electronic device 106(1). As described herein, an interface element may include, but is not limited to, a button, an image, a link, and/or any other type of content that may be included on a user interface and selectable by the user 110. In the example of FIG. 1, the remote system(s) 102 may then receive, from the control device 104, the first electronic device 106(1), and/or another device, first input data 130 representing a selection of the interface element.

The remote system(s) 102 may then associate the control device 104 with the session, the first application 116(1), and/or the first electronic device 106(1). For a first example, the remote system(s) 102 may generate and then store first control data 132, where the first control data 132 associates the control device 104 with the session, the first application 116(1), and/or the first electronic device 106(1). For a second example, and as described in more detail below, the remote system(s) 102 may cause a conductor service to generate and store the first control data 132. In some examples, the first control data 132 may represent at least the identifier associated with the control device 104 and identifier(s) associated with the session, the first application 116(1), and/or the first electronic device 106(1). As such, the remote system(s) 102 and/or the conductor service may be able to analyze the first control data 132 in order to determine that the control device 104 is being used to control the session of the network application that is active for the first electronic device 106(1).

In the example of FIG. 1, the remote system(s) 102 may then provide the session of the network application via the first electronic device 106(1). For instance, the system(s) may send, to the first electronic device 106(1), first content data 134 (e.g., video data, audio data, etc.) representing a first state of the network application. The first electronic device 106(1) may receive the first content data 134 from the remote system(s) 102 and, using the first content data 134, the first electronic device 106(1) may display image(s) representing the first state of the network application. Additionally, in some instances, the first electronic device 106(1) may output sound representing the first state of the network application. The user 110 may then use the control device 104 to provide inputs to the network application via the remote system(s) 102.

For instance, the control device 104 may receive an input, such as a selection of a button, joystick, key, touch-sensitive pad, sensor, and/or the like associated with the control device 104. The control device 104 may then send, to the remote system(s) 102, second input data 130 representing the input. Using the second input data 130, the remote system(s) 102 may update the first state of the application to a second state of the application. The remote system(s) may then send, to the first electronic device 106(1), second content data 134 (e.g., video data, audio data, etc.) representing a second state of the network application. The first electronic device 106(1) may receive the second content data 134 from remote system(s) 102 and, using the second content data 134, the first electronic device 106(1) may display image(s) representing the second state of the network application. Additionally, in some instances, the first electronic device 106(1) may output sound representing the second state of the network application. The remote system(s) 102 may continue this process as long as the session is active for the first application 116(1) and/or the first electronic device 106(1).

As described above, in some examples, the session may still be active for the first electronic device 106(1) based on the remote system(s) 102 (e.g., an application service) continuing to send content data 134 associated with the session to the first electronic device 106(1). For example, the session may still be active for the first electronic device 106(1) based on the remote system(s) 102 continuing to stream the content data 134 to the first electronic device 106(1). Additionally, or alternatively, in some examples, the session may still be active for the first electronic device 106(1) based on the first electronic device 106(1) continuing to execute the first application 116(1). Additionally, or alternatively, in some examples, the session may still be active for the first electronic device 106(1) based on the session being associated with the first application 116(1) and/or the first electronic device 106(1).

In the example of FIG. 1, and as illustrated by the dashed line, the user 110 may determine to move to a second portion 112(2) (e.g., a second room) of the structure 114 in order to use the second electronic device 106(2). As such, the second electronic device 106(2) may launch a second application 116(2) that is associated with the network application(s) provided by the remote system(s) 102. In some examples, the second application 116(2) may be similar to the first application 116(1). However, in other examples, the second application 116(2) may be different than the first application 116(1) (e.g., the second application 116(2) may be configured for a first type of device while the first application 116(1) is configured for a first type of device). The second electronic device 106(2) may launch the second application 116(2) based on receiving an input from the user 110. In some examples, the second electronic device 106(2) may also receive credentials from the user 110 before launching the second application 116(2).

The remote system(s) 102 may then receive, from the second electronic device 106(2), second identifier data 120 that identifies the user profile associated with the user 110 and/or the second electronic device 106(2). The remote system(s) 102 may then use the second identifier data 120 to identify the second electronic device 106(2) and/or the user profile. For a first example, the remote system(s) 102 may determine that credentials represented by the second identifier data 120 correspond to (e.g., match) the credentials associated with the user profile. For a second example, the remote system(s) 102 may determine that an identifier represented by the second identifier data 120 corresponds to (e.g., matches) an identifier associated with the user profile, where the identifier is associated with the second electronic device 106(2). In either of the examples, the remote system(s) 102 may use the determination to identify the user profile and/or the second electronic device 106(2).

The remote system(s) 102 may also receive, from the second electronic device 106(2), second request data 124 that represents a request to launch the same network application that the user 110 was controlling using the first electronic device 106(1). For example, the second request data 124 may also represent the identifier of the network application that is selected by the user 110. Using the second request data 124, the remote system(s) 102 may identify the network application. The remote system(s) 102 may then determine whether there is a current active of the network application. As described in more detail below, the remote system(s) 102 may determine whether there is a current active session using the first session data 126 and/or the session service. In the example of FIG. 1, the remote system(s) 102 may determine that there is a current active session at the second time, where the current active session is active for the first application 116(1) and/or the first electronic device 106(1).

As such, the remote system(s) 102 may send, to the second electronic device 106(2), second user interface data 128 representing a second user interface. In some instances, the remote system(s) 102 generate the second user interface data 128 while in other examples, and as discussed in more detail below, the remote system(s) 102 receive the second user interface data 128 from a page service. The second user interface may include at least an indication that the session is active for another electronic device (e.g., the first electronic device 106(1)), a first interface element for transferring the session to the second electronic device 106(2), and a second interface element for canceling the transfer. Based on receiving the second user interface data 128, the second electronic device 106(2) may display the second user interface to the user 110. In the example of FIG. 1, the remote system(s) 102 may then receive, from the second electronic device 106(2), the control device 104, and/or another device, third input data 130 representing a selection of the first interface element. As such, the remote system(s) 102 may determine to transfer to session from being active for the first electronic device 106(1) to being active for the second electronic device 106(2).

To perform the transfer, the remote system(s) 102 may associate the session with the second application 116(2) and/or the second electronic device 106(2). For a first example, the remote system(s) 102 may generate and then store second session data 126, where the second session data 126 associates the session with the second application 116(2) and/or the second electronic device 106(2). For a second example, and as described in more detail below, the remote system(s) 102 may cause the session service to generate and store the second session data 126. In some examples, the second session data 126 may represent at least the identifier associated with the session and identifier(s) associated with the second application 116(2) and/or the second electronic device 106(2). As such, the remote system(s) 102 and/or the session service may be able to analyze the second session data 126 in order to determine that there is an active session for the network application for the second application 116(2) and/or the second electronic device 106(2).

The remote system(s) 102 may also associate the control device 104 with the session, the second application 116(2), and/or the second electronic device 106(2). For example, the remote system(s) 102 may determine that the control device 104 is associated with the session that is active for the first application 116(1) and/or the first electronic device 106(1). In some instances, and as discussed below, the remote system(s) 102 make the determination using the first control data 132 and/or the conductor service. In some examples, the remote system(s) 102 may then automatically transfer the control device 104 to be associated with the session that is now activate for the second application 116(2) and/or the second electronic device 106(2). In other examples, the remote system(s) 102 may initially request whether the user 110 wants to transfer the control device 104 to be associated with the session that is now active for the second application 116(2) and/or the second electronic device 106(2).

For example, the remote system(s) 102 may send, to the second electronic device 106(2), third user interface data 128 representing a third user interface. In some instances, the remote system(s) 102 generate the third user interface data 128 while in other examples, and as discussed in more detail below, the remote system(s) 102 receive the third user interface data 128 from the page service. The third user interface may include at least an indication of the control device 104 (e.g., an identifier, such as a name, of the control device 104) and an interface element for associating the control device 104 with the session that is active for the second application 116(2) and/or the second electronic device 106(2). In the example of FIG. 1, the remote system(s) 102 may then receive, from the control device 104, the second electronic device 106(2), and/or another device, fourth input data 130 representing a selection of the interface element.

The remote system(s) 102 may then associate the control device 104 with the session that is active for the second application 116(2) and/or the second electronic device 106 (2). For a first example, the remote system(s) 102 may generate and then store second control data 132, where the second control data 132 associates the control device 104 with the session, the second application 116(2), and/or the second electronic device 106(2). For a second example, and as described in more detail below, the remote system(s) 102 may cause the conductor service to generate and store the second control data 132. In some examples, the second control data 132 may represent at least the identifier associated with the control device 104 and identifier(s) associated with the session, the second application 116(2), and/or the second electronic device 106(2). As such, the remote system(s) 102 and/or the conductor service may be able to analyze the second control data 132 in order to determine that the control device 104 is being used to control the session of the network application that is active for the second electronic device 106(2).

In the example of FIG. 1, the remote system(s) 102 may then provide the session of the network application via the second electronic device 106(2). For instance, the remote system(s) 102 may send, to the second electronic device 106(2), third content data 134 (e.g., video data, audio data, etc.) representing a third state of the network application. The second electronic device 106(2) may receive the third content data 134 from remote system(s) 102 and, using the third content data 134, the second electronic device 106(2) may display image(s) representing the third state of the network application. Additionally, in some instances, the second electronic device 106(2) may output sound representing the third state of the network application. The user 110 may then use the control device 104 to provide inputs to the network application via the remote system(s) 102.

For instance, the control device 104 may receive an input, such as a selection of a button, joystick, key, touch-sensitive pad, sensor, and/or the like associated with the control device 104. The control device 104 may then send, to the remote system(s) 102, fifth input data 130 representing the input. Using the fifth input data 130, the remote system(s) 102 may update the third state of the application to a fourth state of the application. The remote system(s) 102 may then send, to the second electronic device 106(2), fourth content data 134 (e.g., video data, audio data, etc.) representing a fourth state of the network application. The second electronic device 106(2) may receive the fourth content data 134 from remote system(s) 102 and, using the fourth content data 134, the second electronic device 106(2) may display image(s) representing the fourth state of the network application. Additionally, in some instances, the second electronic device 106(2) may output sound representing the fourth state of the network application. The remote system(s) 102 may continue this process as long as the session is still active for the second application 116(2) and/or the second electronic device 106(2).

While the examples above describe the remote system(s) 102 using request data 124 to identify the network application, in other examples, the remote system(s) 102 may identify the network application using other types of data. For examples, the remote system(s) 102 may initially send, to the first electronic device 106(1) (and/or similarly the second electronic device 106(2)), user interface data 128 representing a user interface that includes network application(s) (e.g., includes a list of network application(s)) that are selectable by the user 110. While the first electronic device 106(1) (and/or the second electronic device 106(2)) are displaying the user interface, the remote system(s) 102 may receive, from the control device 104, input data 130 representing a selection of the network application from the network application(s). As such, the remote system(s) 102 may identify the network application using the input data 130. For example, the remote system(s) 102 may analyze the input data 130 in order to determine that the input data represents the selection of the network application.

Additionally, although the example of FIG. 1 describes transferring the session of the network application between electronic devices 106 that are associated with the same user profile, in other examples, similar processes may be used to transfer the session of the network application between electronic devices that are associated with different user profiles. In such an example, the user 110 (and/or another user) may use the second electronic device 106(2) to login to another user profile. The remote system(s) 102 may then transfer the session of the network application from being active for the user profile on the first electronic device 106(1) to being active for the other user profile on the second electronic device 106(2).

FIGS. 2A-2E illustrate an example process 200 for transferring an active session associated with a network application from the first electronic device 106(1) to the second electronic device 106(2), in accordance with examples of the present disclosure. As shown, the example process 200 of FIGS. 2A-2E illustrates communications between the second electronic device 106(2), a proxy service 202, a session service 204, a page service 206, a conductor service 208, a challenge service 210, and an application service 212. In some examples, the remote system(s) 102 may include the proxy service 202, the session service 204, the page service 206, the conductor service 208, the challenge service 210, and/or the application service 212. In some examples, the proxy service 202, the session service 204, the page service 206, the conductor service 208, the challenge service 210, and/or the application service 212 may be remote from the remote system(s) 102.

At 214, the user 110 may open an application on the second electronic device 106(2). For example, the second electronic device 106(2) may receive an input selecting the second application 116(2) and/or receive an input indicating credentials associated with the user profile. At 216, the second electronic device 106(2) may then send a request for an active session to the proxy service 202. For example, the second electronic device 106(2) may send, to the proxy service 202, first request data 124 representing a request for the active session. For example, the first request data 124 may represent an identifier associated with the user profile and/or an identifier associated with the network application.

At 218, the proxy service 202 may then send a request for the active session to the session service 204. For example, the proxy service 202 may then send, to the session service 204, second request data 124 for the active session. For example, the second request data 124 may represent the identifier associated with the user profile and/or the identifier associated with the network application. Based on receiving the second request data 124, the session service 204 may analyze first session data 126 to determine that there is an active session associated with the network application for the first electronic device 106(1).

At 220, the session service 204 may send an indication of the active session to the proxy service 202 and at 222, the proxy service 202 may send an indication of the active session to the second electronic device 106(2). For example, after identifying the active session, the session service 204 may send, to the proxy service 202, data that identifies that the session is active for the first electronic device 106(1). The proxy service 202 may then send, to the second electronic device 106(2), data that identifies that the session is active for the first electronic device 106(1).

At 224, the second electronic device 106(2) may then send a request for a dialog page to the proxy service 202. For example, the second electronic device 106(2) may send, to the proxy service 202, third request data 124 for the dialog page. At 226, the proxy service 202 may then send a request for the dialog page to the page service 206. For example, the proxy service 202 may send, to the page service 206, fourth request data 124 for the dialog page. Based on receiving the fourth request data 124, the page service 206 may generate the dialog page, which may include a first user interface. For example, the dialog page may include an indication that the session is active for another electronic device (e.g., the first electronic device 106(1), a first interface element for transferring the session to the second electronic device 106(2), and a third interface element for canceling the transfer.

At 228, the page service 206 may then send the dialog page to the proxy service 202 and at 230, the proxy service 202 may send the dialog page to the second electronic device 106(2). For example, the page service 206 may send, to the proxy service 202, first user interface data 128 that represents the dialog page. The proxy service 202 may then send the first user interface data 128 to the second electronic device 106(2). Based on receiving the first user interface data 128, and at 232, the second electronic device 106(2) may display the dialog page to the user 110. While displaying the dialog page, and at 234, the user 110 may then select the active session.

At 236, the second electronic device 106(2) may then send a request for a controller identifier to the proxy service 202. For example, the second electronic device 106(2) may send, to the proxy service 202, fifth request data 124 representing the request for the controller identifier. At 238, the proxy service 202 may then send a request for the controller identifier to the conductor service 208. For example, the proxy service 202 may send, to the conductor service 208, sixth request data 124 representing the request for the controller identifier. The conductor service 208 may then analyze first control data 132 to determine that the control device 104 is associated with the session that is active for the first application 116(1) and/or the first electronic device 106(1).

At 240, the conductor service 208 may send the controller identifier to the proxy service 202 and at 242, the proxy service 202 may send the controller identifier to the second electronic device 106(2). For example, based on identifying the control device 104, the conductor service 208 may send, to the proxy service 202, data that identifies at least the control device 104, where the proxy service 202 may then send the data to the second electronic device 106(2). At 244, the second electronic device 106(2) may then select the controller identifier. For example, the second electronic device 106(2) may select to use the control device 104 for the active session.

At 246, the second electronic device 106(2) may then send a request for a details page to the proxy service 202. For example, the second electronic device 106(2) may send, to the proxy service 202, seventh request data 124 for the details page. At 248, the proxy service 202 may then send a request for the details page to the page service 206. For example, the proxy service 202 may send, to the page service 206, eighth request data 124 for the details page. Based on receiving the eighth request data 124, the page service 206 may generate the details page, which may include a second user interface. For example, the details page may include an indication that the session is being transferred to the second electronic device 106(2).

At 250, the page service 206 may then send the details page to the proxy service 202 and at 252, the proxy service 202 may send the details page to the second electronic device 106(2). For example, the page service 206 may send, to the proxy service 202, second user interface data 128 that represents the details page. The proxy service 202 may then send the second user interface data 128 to the second electronic device 106(2). Based on receiving the second user interface data 128, and at 254, the second electronic device 106(2) may display the details page to the user 110. At 256, the second electronic device 106(2) may then select to play the network application.

At 258, the second electronic device 106(2) may then send a request for a challenge to the proxy service 202. For example, the second electronic device 106(2) may send, to the proxy service 202, ninth request data 124 representing a request for the challenge. The challenge may be associated with a parental identification number for the user profile. For example, the challenge may include a request for the user 110 to input the parental identification number. At 260, the proxy service 202 may then send a request for the challenge to the challenge service 210. For example, the proxy service 202 may send, to the challenge service 210, tenth request data 124 representing a request for the challenge. Based on receiving the tenth request data 124, the challenge service 210 may generate the challenge for the user 110.

At 262, the challenge service 210 may then send the challenge to the proxy service 202 and at 264, the proxy service 202 may send the challenge to the second electronic device 106(2). For example, the challenge service 210 may send, to the proxy service 202, data representing the challenge. The proxy service 202 may then send the data representing the challenge to the second electronic device 106(2). Based on receiving the data, and at 266, the second electronic device 106(2) may display the challenge to the user 110.

At 268, the user 110 may input a response to the challenge. Next, at 270, the second electronic deice 106(2) may determine if the response to the challenge is correct. For a first example, if the challenge requests a number, then the second electronic device 106(2) may determine if the response includes the number. For a second example, if the challenge requests another type of code, then the second electronic device 106(2) may determine if the response includes the code. In some examples, the second electronic device 106(2) may then display whether the response to the challenge was correct.

At 272, the second electronic device 106(2) may then send a request for the session identifier to the proxy service 202. For example, the second electronic device 106(2) may send, to the proxy service 202, eleventh request data 124 representing a request for the session identifier associated with the session. The session identifier may be used to determine a status and/or other information associated with the session. At 274, the proxy service 202 may then send a request for the session identifier to the session service 204. For example, the proxy service 202 may send, to the session service 204, twelfth request data 124 representing a request for the session identifier.

At 276, the session service 204 may then send the session identifier to the proxy service 202 and at 278, the proxy service 202 may send the session identifier to the second electronic device 106(2). Next, at 280, the second electronic device 106(2) may then send a request to get the session to the session service 204. For example, the second electronic device 106(2) may send, to the proxy service 202, thirteenth request data 124 representing a request to transfer the session from being active for the first application 116(1) and/or the first electronic device 106(1) to being active for the second application 116(2) and/or the second electronic device 106(2). The thirteenth request data 124 may represent at least the session identifier. At 282, the proxy service 202 may then send a request to get the session to the session service 204. For example, the proxy service 202 may send, to the session service 204, fourteenth request data representing a request to transfer the session from being active for the first application 116(1) and/or the first electronic device 106(1) to being active for the second application 116(2) and/or the second electronic device 106(2). The fourteenth request data 124 may represent at least the session identifier.

At 284, the session service 204 may then send a status about the session to the proxy service 202 and at 286, the proxy service 202 may send the status about the session to the second electronic device 106(2). For example, the session service 204 may determine the status associated with the session, such that the transfer is pending and/or not ready. The session service 204 may then send data representing the status to the proxy service 202, which may send the data to the second electronic device 106(2). In some instances, the second electronic device 106(2) may then display the status to the user 110.

At 288, the session service 204 may then send the session to the proxy service 202 and at 290, the proxy service 202 may send the session to the second electronic device 106(2). For example, the session service 204 may determine the status associated with the session is now ready. The session service 204 may then send data representing the status to the proxy service 202, which may send the data to the second electronic device 106(2). In some instances, the second electronic device 106(2) may then display, to the user 110, that the session is ready.

At 292, the second electronic device 106(2) may connect to the session using the application service 212 and at 294, the application service 212 may indicate that the second electronic device 106(2) successfully connected to the session. For example, the second electronic device 106(2) may use the information about the session to connect to the session that is provided by the application service 212. At 296, the second electronic device 106(2) may display content related to the session.

Figure 3:
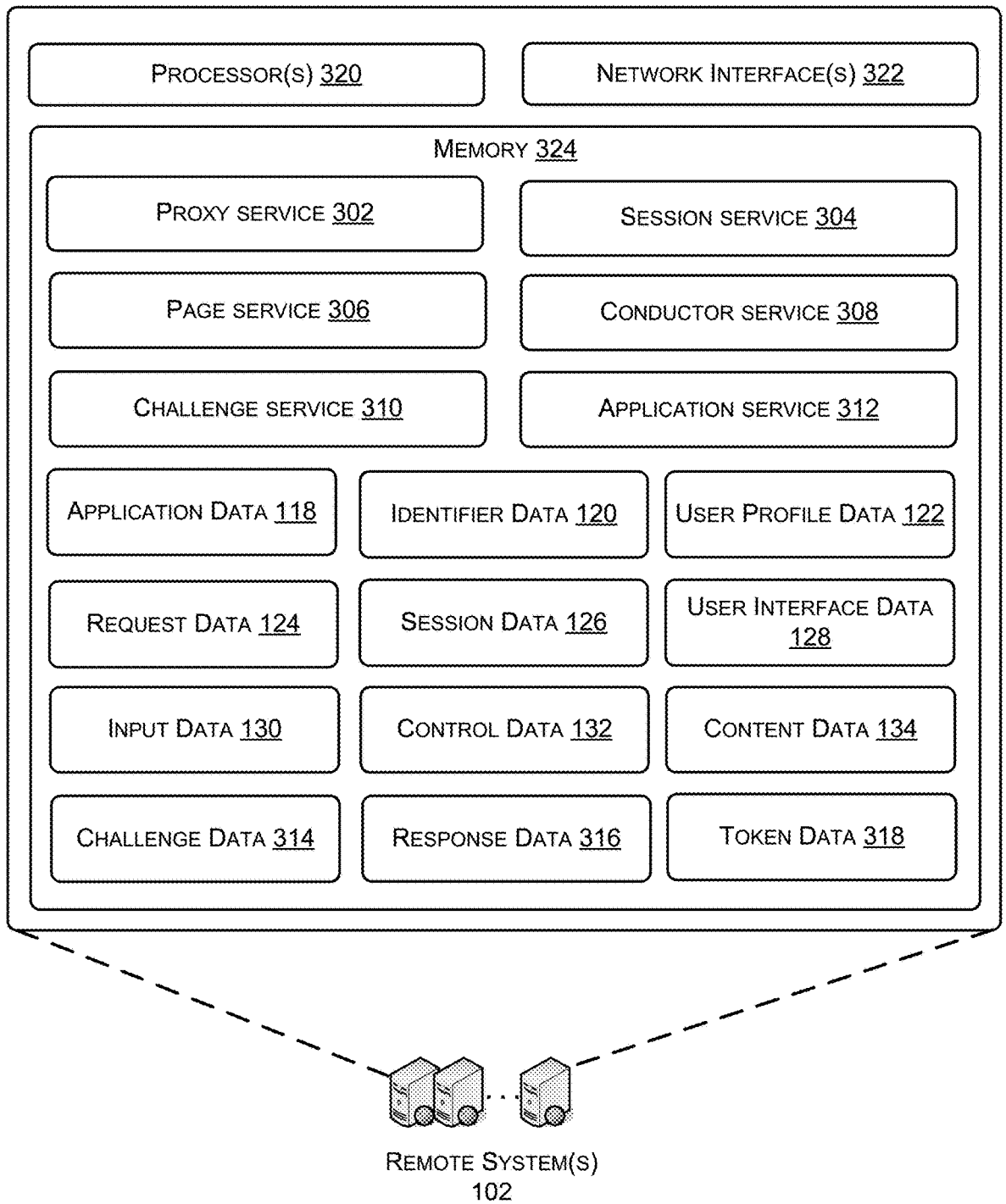
FIG. 3 illustrates a block diagram of an example architecture of remote system(s), in accordance with examples of the present disclosure.

FIG. 3 illustrates a block diagram of an example architecture of the remote system(s) 102, in accordance with examples of the present disclosure. As shown, the remote system(s) 102 may include a proxy service 302, a session service 304, a page service 306, a conductor service 308, a challenge service 310, and an application service 312. In the example of FIG. 3, the proxy service 302, the session service 304, the page service 306, the conductor service 308, the challenge service 310, and/or the application service 312 may respectively include, and/or represent, the proxy service 202, the session service 204, the page service 206, the conductor service 208, the challenge service 210, and/or the application service 212.

In other examples, the remote system(s) 102 may not include one or more of the proxy service 302, the session service 304, the page service 306, the conductor service 308, the challenge service 310, or the application service 312. Additionally, in some examples, the proxy service 302, the session service 304, the page service 306, the conductor service 308, the challenge service 310, and the application service 312 may store at least some of the data illustrated in the example of FIG. 3. For instance, the session service 304 may generate and/or store the session data 126, the conductor service 308 may generate and/or store the control data 132, and/or the page service 306 may generate and/or store the user interface data 128.

As further illustrated in the example of FIG. 3, the remote system(s) 102 may store challenge data 314 and response data 316. The challenge data 314 may represent a challenge that is provided to the user 110. As described above, the challenge may include a request for the user 110 to input the parental identification number. In some examples, the parental identification number may be represented by the user profile data 122. In some instances, the challenge service 310 may generate the challenge data 314. The response data 316 may represent the response that is input by the user 110. For instance, the response may include the parental identification number associated with the challenge. In some instances, the remote system(s) 102 (e.g., the challenge service 310) may determine if the response represented by the response data 316 is correct.

As further illustrated in the example of FIG. 3, the remote system(s) 102 may store token data 318. The token data 318 may indicate whether one or more network applications are accessible by users. For a first example, the token data 318 may indicate that users located within a geographic area are able to access a network application. The geographic area may include, but is not limited to, a town, a city, a state, a country, a continent, and/or any other geographic area. For a second example, the token data 318 may indicate that users within an age group are able to access a network application. In some examples, the token data 318 may be stored in association with the user profile data 122. For example, the token data 318 may indicate which network application(s) a user associated with a user profile is able to access.

For example, the remote system(s) 102 (e.g., the challenge service 310) may compare the response represented by the response data 316 to the parental identification number associated with the user profile to determine whether the response includes the parental identification number. If the remote system(s) 102 (e.g., the challenge service 310) determine that the response corresponds to (e.g., matches) the parental identification number, then the remote system(s) 102 (e.g., the challenge service 310) may determine that the response is correct. However, if the remote system(s) 102 (e.g., the challenge service 310) determine that the response does not correspond to (e.g., does not match) the parental identification number, then the remote system(s) 102 (e.g., the challenge service 310) may determine that the response is not correct.

As further illustrated in the example of FIG. 3, the remote system(s) 102 may include processor(s) 320, network interface(s) 322, and memory 324. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable messages between the remote system(s) 102, the control device 104, the electronic devices 106, the proxy service 302, the session service 304, the page service 306, the conductor service 308, the challenge service 310, and the application service 312, and/or with one or more other remote systems, as well as other networked devices. The network interface(s) may include one or more network interface controllers (NICs) or other types of transceiver devices to send and receive messages over the network(s) 108.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 4:
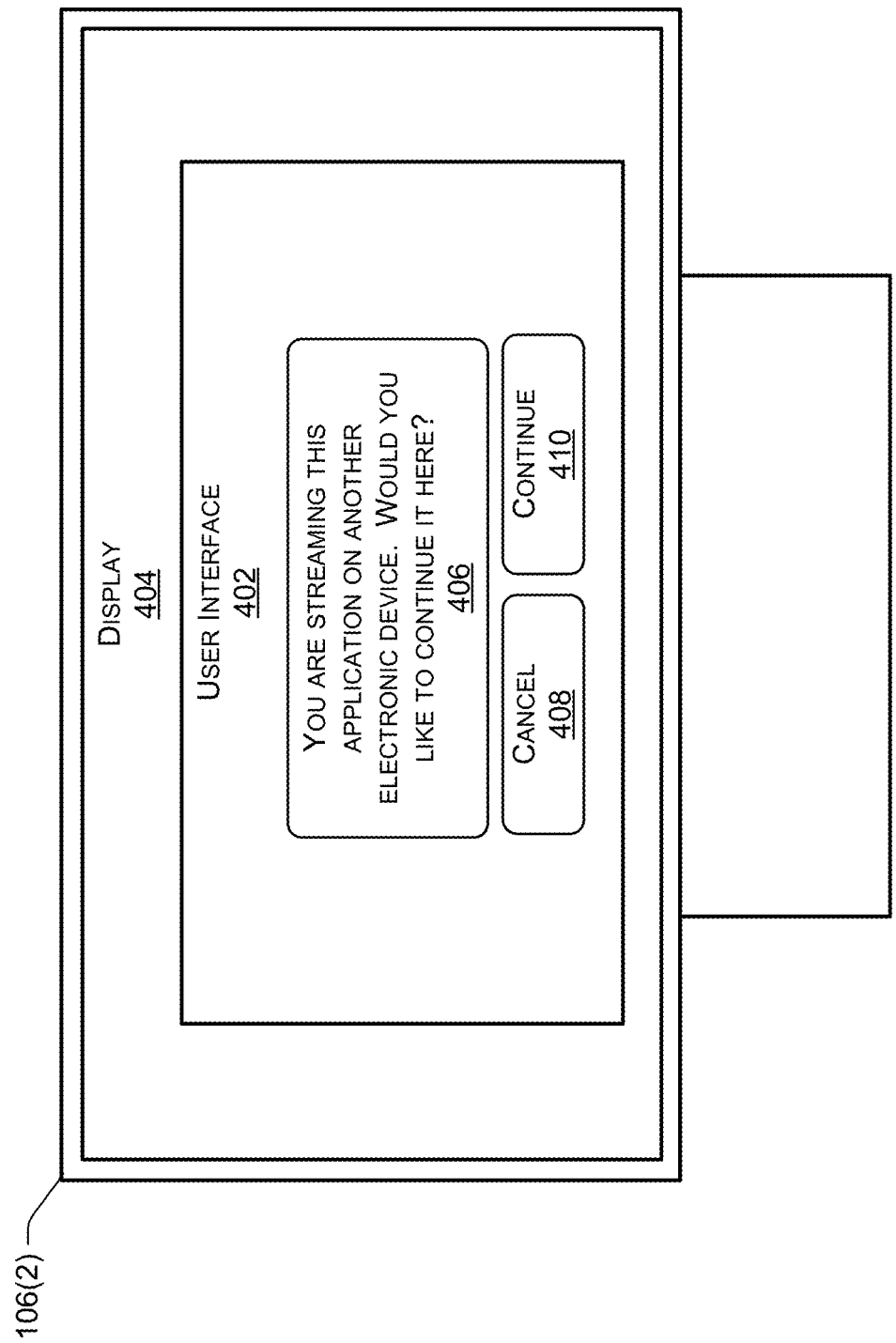
FIG. 4 illustrates an example of an electronic device displaying a user interface for transferring a session of a network application, in accordance with examples of the present disclosure.

FIG. 4 illustrates an example of the second electronic device 106(2) displaying a user interface 402 for transferring a session associated with a network application, in accordance with examples of the present disclosure. As shown, the second electronic device 106(2) may display the user interface 402 using a display 404. The user interface 402 may include at least an indication 406 that the session is currently streamlining to another electronic device (e.g., active for the other electronic device), such as the first electronic device 106(1). Additionally, the user interface 402 includes a first interface element 408 for canceling the transfer of the session to the second electronic device 106(2) and a second interface element 410 for causing the transfer of the session to the second electronic device 106(2), using the processes described above.

In some instances, if the user selects the first interface element 408, then the remote system(s) 102 may determine not to transfer the session to the second electronic device 106(2). Rather, and in some examples, the remote system(s) 102 may send, to the second electronic device 106(2), user interface data 128 representing a user interface that include network applications for selection by the user. While displaying the user interface, the remote system(s) 102 may receive, from the second electronic device 106(2) and/or the control device 104, input data 130 representing a selection of a new network application. In such examples, the remote system(s) 102 may perform the processes above to start a new session for the new network application on the second electronic device 106(2). Additionally, the remote system(s) 102 may cause the session for the original network application to terminate. This may be because the remote system(S) 102 only allow one session for network applications to be active for the user profile at a single instance in time.

Additionally, in some instances, even if the user does not select the second interface element 410 to transfer to the session to the second electronic device 106(2), the remote system(s) 102 may still cause the control device 104 to be associated with the second electronic device 106(2), such as by using the processes described above. This way, the user is still able to control the content being provided by the second electronic device 106(2) even if the user decides not to transfer the session to the second electronic device 106(2). In such examples, the remote system(s) 102 may cause the control device 104 to be associated with the second electronic device 106(2) and/or the application 116(2) executing on the second electronic device 106(2).

FIGS. 5A-7 illustrate various processes for transferring sessions of network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 5A:
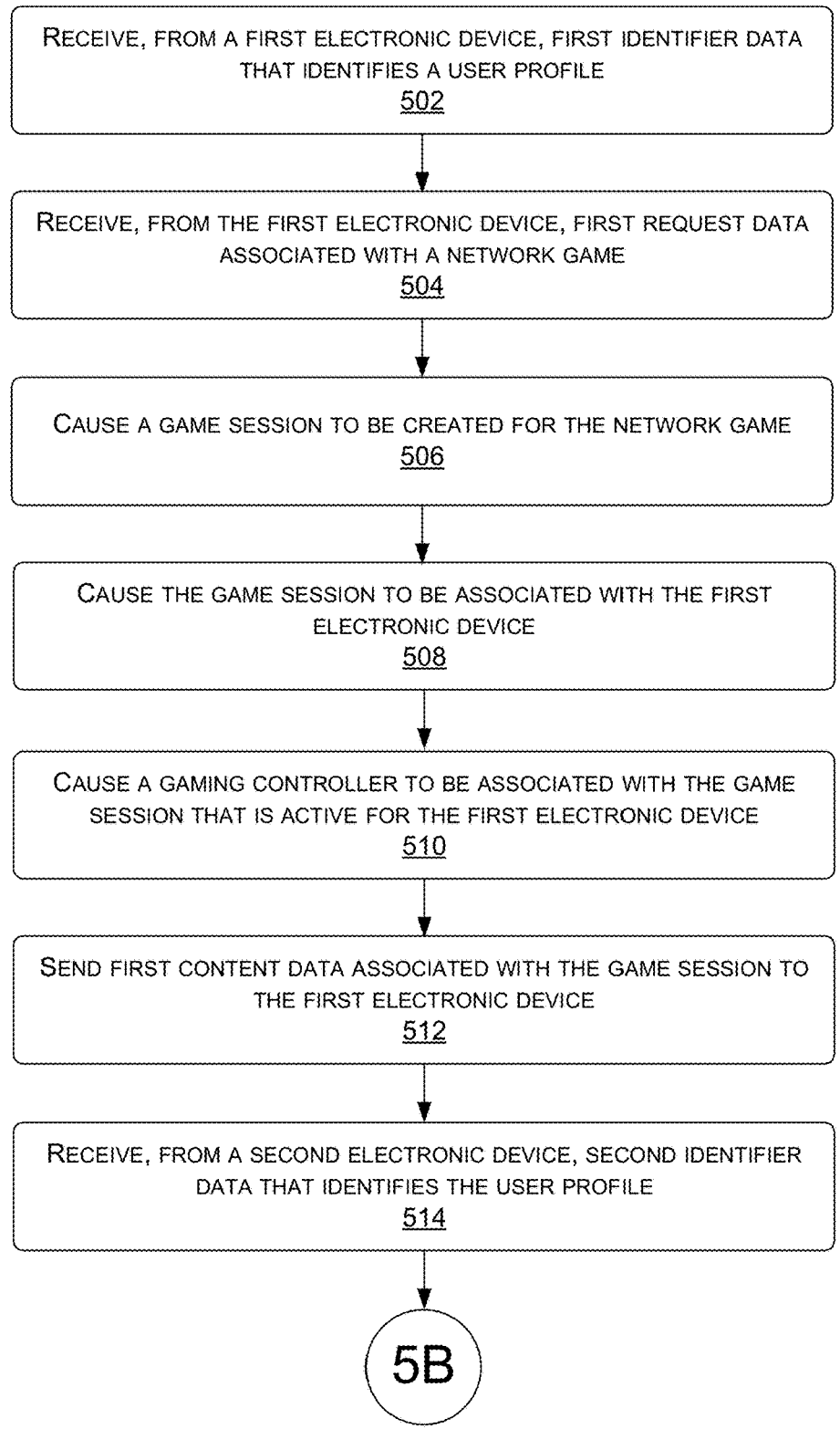
FIGS. 5A-5B illustrate an example process for transferring a session of a network game between electronic devices, in accordance with examples of the present disclosure.
Figure 5B:
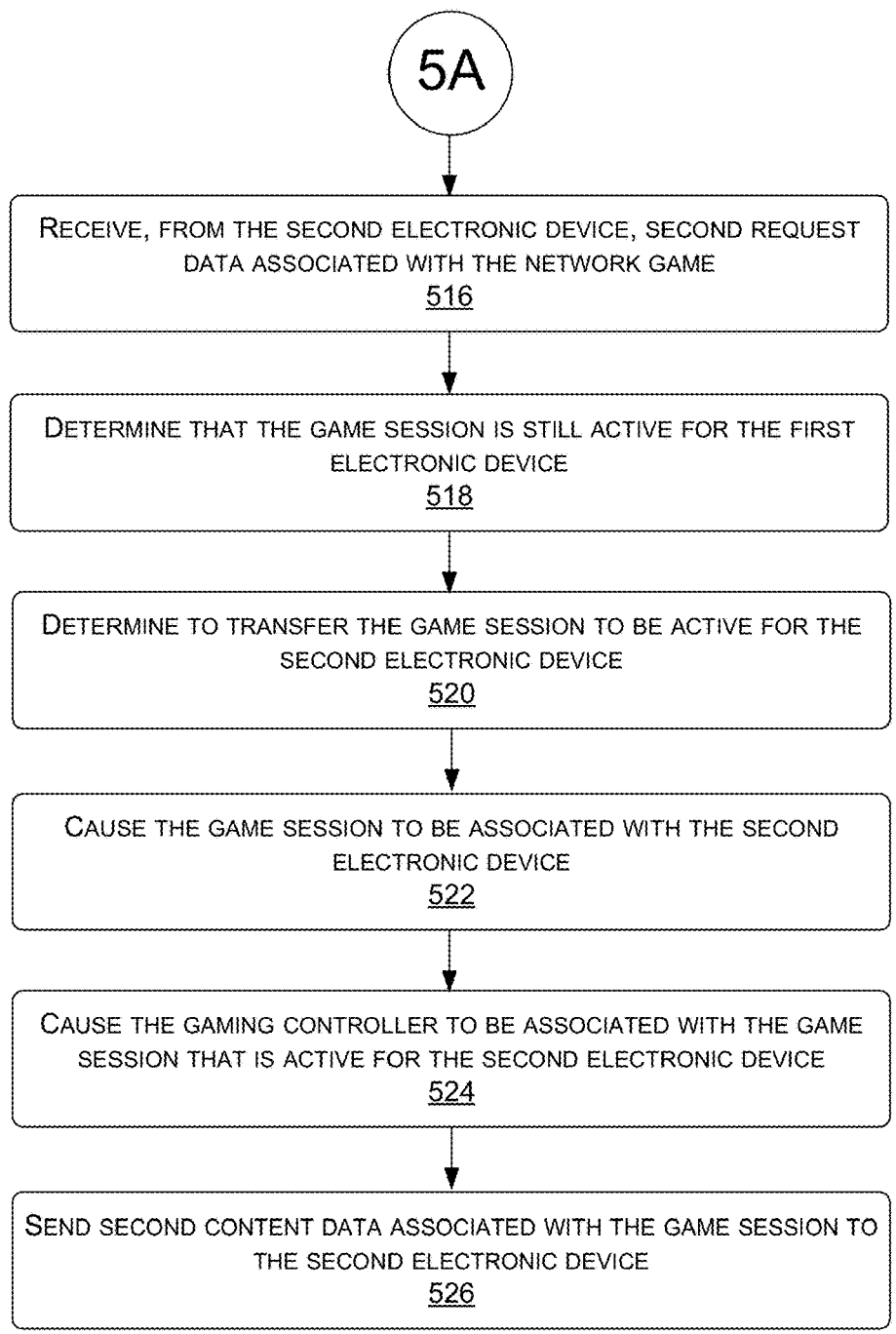

FIGS. 5A-5B illustrate an example process 500 for transferring a session of a network game between electronic devices, in accordance with examples of the present disclosure. At 502, the process 500 may include receiving, from a first electronic device, first identifier data that identifies a user profile. For instance, the remote system(s) 102 may receive the first identifier data from the first electronic device. The remote system(s) 102 may then use the first identifier data to identify the user profile.

At 504, the process 500 may include receiving, from the first electronic device, first request data associated with a network game. For instance, the remote system(s) 102 may receive the first request data from the first electronic device. The remote system(s) 102 may then use the first request data to identify the network game. For example, the first request data may represent at least an identifier (e.g., a name, code, number, etc.) associated with the network game. The remote system(s) 102 may then match the identifier to an identifier represented by application data, where the application data represents the network game. Based on the match, the remote system(s) 102 may identify the network game.

At 506, the process 500 may include causing a game session to be created for the network game. For instance, the remote system(s) 102 may cause the game session to be created for the network game. In some instances, the remote system(s) 102 use a session service and/or a game service to cause game session to be created. In some examples, the remote system(s) 102 initially determine that there is not a currently active game session for the network game before creating the game session.

At 508, the process 500 may include causing the game session to be associated with the first electronic device and at 510, the process 500 may include causing a gaming controller to be associated with the game session that is active for the first electronic device. For instance, the remote system(s) 102 may cause the game session to be associated with the first electronic device and/or a first application being executed by the first electronic device. In some examples, the remote system(s) 102 cause the association using the session service. The remote system(s) 102 may then cause the gaming controller to be associated with the game session that is active for the first electronic device. In some examples, the remote system(s) 102 cause the association using a conductor service. In some examples, the gaming controller is then able to control the game session on the first electronic device.

At 512, the process 500 may include sending first content data associated with the game session to the first electronic device. For instance, the remote system(s) 102 may send the first content data to the first electronic device. The first content data may include image data representing image(s) associated with the game session, audio data representing sound associated with the game session, and/or any other type of data. Based on receiving the first content data, the first electronic device may then display the image(s) associated with the game session and/or output the sound associated with the game session.

At 514, the process 500 may include receiving, from a second electronic device, second identifier data that identifies the user profile. For instance, the remote system(s) 102 may receive the second identifier data from the second electronic device. The remote system(s) 102 may then use the second identifier data to identify the user profile.

At 516, the process 500 may include receiving, from the second electronic device, second request data associated with the network game. For instance, the remote system(s) 102 may receive the second request data from the second electronic device. The remote system(s) 102 may then use the second request data to identify the network game. For example, the second request data may represent at least the identifier (e.g., a name, code, number, etc.) associated with the network game. The remote system(s) 102 may then match the identifier to the identifier represented by the application data, where the application data represents the network game. Based on the match, the remote system(s) 102 may identify the network game.

At 518, the process 500 may include determining that the game session is still active for the first electronic device. For instance, the remote system(s) 102 may determine that the game session is still active for the first electronic device. In some examples, the remote system(s) 102 make the determination using the session service. In some examples, the remote system(s) then send, to the second electronic device, user interface data representing a user interface. The user interface may indicate that the game session is still active for the first electronic device and include an interface element for causing the transfer of the game session to the second electronic device.

At 520, the process 500 may include determining to transfer the game session to be active for the second electronic device. For instance, the remote system(s) 102 may determine to transfer the game session. In some examples, the remote system(s) 102 make the determination based on receiving, from the second electronic device, the gaming controller, and/or another device, input data representing a selection of the interface element. For example, the remote system(s) 102 may analyze the input data to determine that the input data represents a selection of the interface element.

At 522, the process 500 may include causing the game session to be associated with the second electronic device. For instance, the remote system(s) 102 may cause the game session to be associated with the second electronic device and/or a second application being executed by the second electronic device. In some examples, the remote system(s) 102 cause the association using the session service. In some examples, the remote system(s) 102 further cause the game session to no longer be associated with the first electronic device and/or the first application. In such examples, the remote system(s) 102 may cause the game session to no longer be associated with the first electronic device and/or the first application using the session service.

At 524, the process 500 may include causing the gaming controller to be associated with the game session that is active for the second electronic device. For instance, remote system(s) 102 may cause the gaming controller to be associated with the game session that is active for the second electronic device. In some examples, the remote system(s) 102 cause the association using the conductor service. In some examples, before causing the association, the remote system(s) 102 initially determine that the gaming controller is still associated with the first electronic device and/or the first application. The remote system(s) 102 may then send, to the second electronic device, user interface data representing a user interface that includes an indication that the gaming controller is still associated with the first electronic device and an interface element for transferring the gaming controller to the game session that is active for the second electronic device. Additionally, the remote system(s) 102 may receive, from the second electronic device, the game controller, and/or another device, input data representing a selection of the interface element.

At 526, the process 500 may include sending second content data associated with the game session to the second electronic device. For instance, the remote system(s) 102 may send the second content data to the second electronic device. The second content data may include image data representing image(s) associated with the game session, audio data representing sound associated with the game session, and/or any other type of data. Based on receiving the second content data, the second electronic device may then display the image(s) associated with the game session and/or output the sound associated with the game session.

Figure 6:
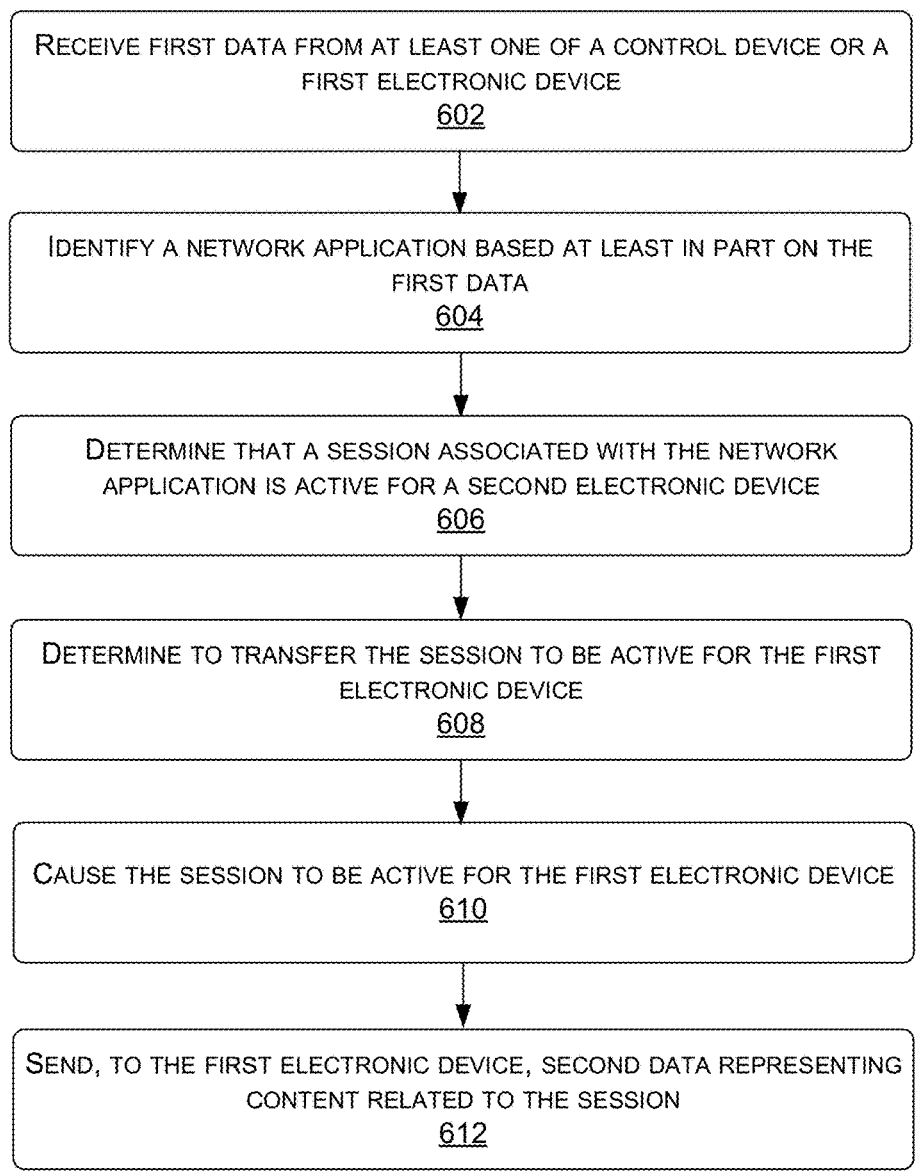
FIG. 6 illustrates a first example process for transferring a session of a network application between electronic devices, in accordance with examples of the present disclosure.

FIG. 6 illustrates a first example process 600 for transferring a session of a network application between electronic devices, in accordance with examples of the present disclosure. At 602, the process 600 may include receiving first data from at least one of a control device or a first electronic device. For instance, the remote system(s) 102 may receive the first data from the control device and/or the first electronic device. In some examples, the first data includes input data received from the control device and/or the first electronic device. In some examples, the first data includes identifier data representing an identifier associated with a network application. Still, in some instances, the first data includes request data representing a request associated with the network application.

At 604, the process 600 may include identifying a network application based at least in part on the first data. For instance, the remote system(s) 102 may use the first data to identify the network application. In some examples, when the first data includes input data, the remote system(s) 102 may identify the network application by determining that the input data represents a selection of the network application. In some examples, when the first data includes identifier data, the remote system(s) 102 may identify the network application by determining that an identifier represented by the identifier data corresponds to (e.g., matches) an identifier associated with the network application. Still, in some examples, when the first data includes request data, the remote system(s) 102 may identify the network application by determining that the request is for the network application.

At 606, the process 600 may include determining that a session associated with the network application is active for a second electronic device. For instance, the remote system(s) 102 may determine that the session is active for the second electronic device. In some examples, the session may be still active for the second electronic device based on the remote system(s) 102 (and/or an application service) still sending content data associated with the session to the second electronic device. In some examples, the first electronic device and the second electronic device may be associated with the same user profile. In other examples, the first electronic device and the second electronic device may be associated with different user profiles.

At 608, the process 600 may include determining to transfer the session to be active for the first electronic device. For instance, the remote system(s) 102 may determine to transfer the session. In some examples, to make the determination, the remote system(s) 102 send, to the first electronic device, user interface data representing a user interface. The user interface may include an indication that the session is still active for the second electronic device, a first interface element for transferring the session to the first electronic device, and a second interface element for canceling the transfer of the session to the first electronic device. Based on sending the user interface data, the remote system(s) 102 may then receive, from the first electronic device, a control device, and/or another device, input data representing a selection of the first interface element. The remote system(s) 102 may then use the input data to determine to transfer the session to be active for the first electronic device.

At 610, the process 600 may include causing the session to be active for the first electronic device. For instance, the remote system(s) 102 may cause the session to be active for the first electronic device. In some examples, the remote system(s) 102 cause the session to be active by associating the session with the first electronic device (and/or an application executing on the first electronic device). In some examples, the remote system(s) 102 cause the session to be active by sending data associated with the session to the first electronic device.

Additionally, the remote system(s) 102 may terminate the session for the second electronic device. In some examples, the remote system(s) 102 terminate the session by causing the session to no longer be associated with the second electronic device (and/or an application executing on the second electronic device). In some examples, the remote system(s) 102 terminate the session by no longer sending data associated with the session to the second electronic device (e.g., causing the data to no longer stream to the second electronic device).

At 610, the process 600 may include sending, to the first electronic device, second data representing content related to the session. For instance, the remote system(s) 102 may send the second data to the first electronic device. The second data may include image data representing image(s)

associated with the session, audio data representing sound associated with the session, and/or any other type of data. Based on receiving the second data, the second electronic device may then display the image(s) associated with the session and/or output the sound associated with the session.

Figure 7:
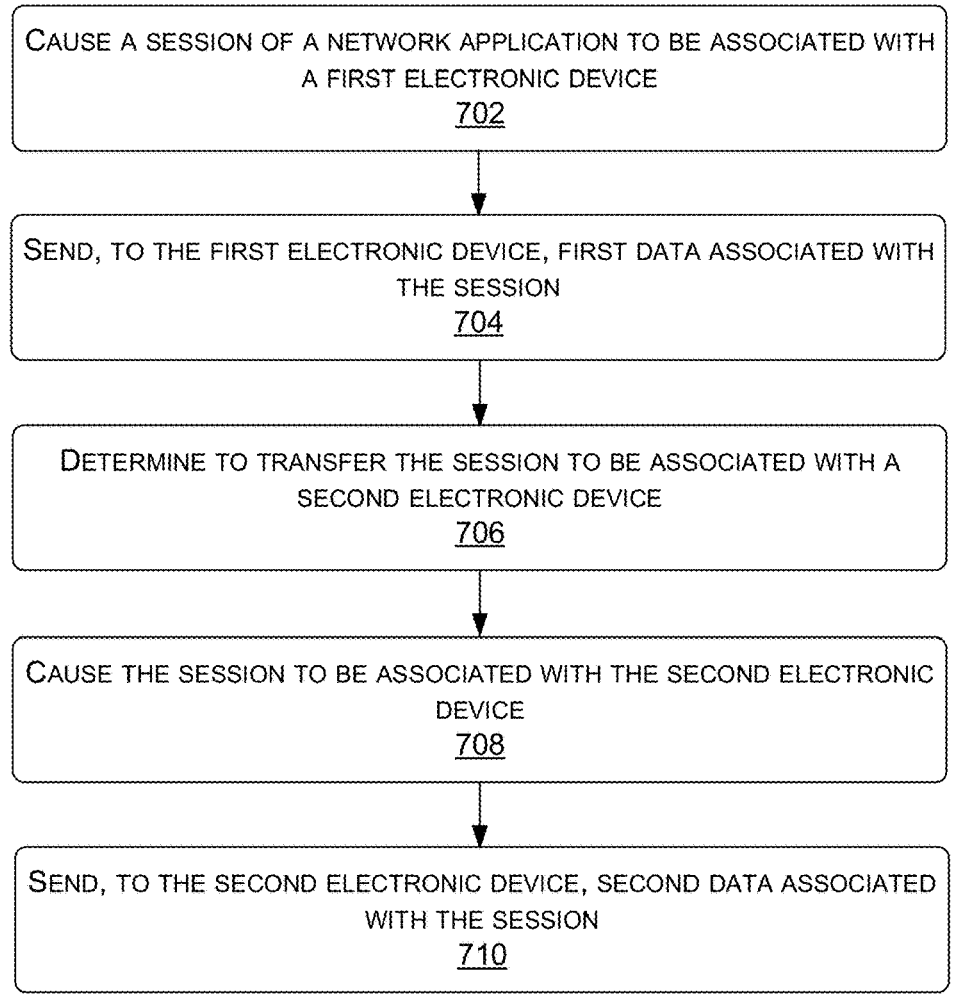
FIG. 7 illustrates a second example process for transferring a session of a network application between electronic devices, in accordance with examples of the present disclosure.

FIG. 7 illustrates a second example process 700 for transferring a session of a network application between electronic devices, in accordance with examples of the present disclosure. At 702, the process 700 may include causing a session of a network application to be associated with a first electronic device and at 704, the process 700 may include sending, to the first electronic device, first data associated with the session. For instance, the remote system(s) 102 may cause the session to be created for and associated with the first electronic device (and/or a first application executing on the first electronic device). The remote system(s) 102 may then send the first data, such as first image data representing a first state of the network application, to the first electronic device.

At 706, the process 700 may include determining to transfer the session to be associated with a second electronic device. For instance, the remote system(s) 102 may determine to transfer the session. In some instances, the remote system(s) 102 make the determination by receiving data associated with starting the network application on the second electronic device. The remote system(s) 102 may then identify that a user profile is associated with the second electronic device and the first electronic device (e.g., a user logged into the user profile using both the second electronic device and the first electronic device). Additionally, the remote system(s) 102 may determine that the session is still active for the first electronic device. As such, the remote system(s) 102 may determine to transfer the session to the second electronic device.

At 708, the process 700 may include causing the session to be associated with the second electronic device and at 710, the process 700 may include sending, to the second electronic device, second data associated with the session. For instance, the remote system(s) 102 may cause the session to be transferred to being associated with the second electronic device (and/or a second application executing on the second electronic device). The remote system(s) 102 may then send the second data, such as second image data representing a second state of the network application, to the second electronic device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
   one or more processors; and
   one or more computer-readable media storing instructions that, when executed by the one or more processors, cause the system to perform operations comprising:
   receiving, from a first electronic device, first identifier data associated with a user profile;
   identifying the user profile using the first identifier data;
   cause a game session to be created for a network game, the game session associated with session data comprising a first indicator identifying a control device and a second indicator identifying the game session;
   causing the game session to be associated with the first electronic device;
   causing, based on the session data and in response to the game session being associated with the first electronic device, the control device to be associated with the first electronic device;
   receiving first input data from the control device;
   generating, based at least in part on the first input data, first content data associated with the network game during the game session;
   sending, to the first electronic device, the first content data associated the network game;
   receiving, from a second electronic device, a request to associate the game session with the second electronic device, the request based at least in part on second identifier data associated with the user profile and the user profile being associated with the second electronic device;
   identifying the user profile using the second identifier data;
   determining that the game session is still associated with the first electronic device;
   determining to associate the game session with the second electronic device;
   causing the game session to be associated with the second electronic device;
   determining, based on the game session being associated with the second electronic device and the user profile being associated with the second electronic device, to associate the control device with the second electronic device;
   causing the control device to be associated with the second electronic device;
   receiving second input data from the control device;
   generating, based at least in part on the second input data, second content data associated with the network game during the game session; and
   sending, to the second electronic device, the second content data associated with the network game.

2. The system as recited in claim 1, the operations further comprising:
   sending, to the second electronic device, user interface data representing a user interface, the user interface including:
      an indication that the game session is still active for the first electronic device; and
      an interface element for continuing the game session on the second electronic device; and
   receiving third input data representing a selection of the interface element,
   and wherein determining to the associate the game session is based at least in part on receiving the third input data.

3. A method comprising:
   generating session data, the session data comprising information associated with a session of a network application and user profile data comprising an indicator associated with a control device;
   causing the session to be associated with a first electronic device;

based on the session being associated with the first electronic device and the session data, causing the control device to be associated with the first electronic device;

sending, to the first electronic device, first data related to the session of the network application;

receiving, from a second electronic device, a request to associate the session with the second electronic device, the request based at least in part on the user profile data being associated with the second electronic device;

causing the session of the network application to be associated with the second electronic device;

based on the session being associated with the second electronic device and the user profile data being associated with the second electronic device, causing the control device to be associated with the second electronic device; and sending, to the second electronic device, second data related to the session of the network application.

4. The method as recited in claim 3, further comprising:
sending, to the second electronic device, third data representing a user interface, the user interface including:
an indication that the session is still associated with the first electronic device; and
an interface element for associating the session with the second electronic device,
wherein receiving the request to associate the session of the network application comprises receiving, from the second electronic device, fourth data representing a selection of the interface element.

5. The method as recited in claim 3, further comprising:
sending, to the second electronic device, third data representing a user interface, the user interface including:
an indication that the control device is associated with the first electronic device; and
an interface element for causing the control device to be associated with the second electronic device; and
receiving, from the second electronic device, fourth data representing a selection of the interface element,
and wherein causing the control device to be associated with the second electronic device is based at least in part on receiving the fourth data.

6. The method as recited in claim 3, further comprising:
sending, to one or more computing devices, third data associated with a user profile; and
receiving, from the one or more computing devices, fourth data indicating that the control device is associated with the first electronic device.

7. The method as recited in claim 3, further comprising:
sending, to one or more computing devices, third data associated with a user profile; and
receiving, from the one or more computing devices, fourth data indicating that the session is associated with the first electronic device.

8. The method as recited in claim 3, further comprising:
receiving, from the first electronic device, third data associated with the network application,
wherein causing the session of the network application to be created is based at least in part on receiving the third data.

9. The method as recited in claim 3, further comprising:
receiving, from the first electronic device, third data associated with a user profile;
identifying the user profile based at least in part on the third data;
receiving, from the second electronic device, fourth data associated with the user profile;

identifying the user profile based at least in part on the fourth data; and
determining that the session is associated with the first electronic device based at least in part on the user profile.

10. The method as recited in claim 3, further comprising:
sending, to the second electronic device, third data representing a challenge;
receiving, from the second electronic device, fourth data representing a response to the challenge; and
determining that the response to the challenge is correct,
and wherein causing the session to be associated with the second electronic device is based at least in part on the response to the challenge being correct.

11. The method as recited in claim 3, further comprising, based at least in part on receiving the request to associate the session of the network application, causing the session to no longer be associated with the first electronic device.

12. The method as recited in claim 3, wherein:
the network application is a network game;
the first data represents first content related to the session, the first content representing a first state of the network game; and
the second data represents second content related to the session, the second content representing a second state of the network game.

13. The method as recited in claim 3, further comprising:
receiving third data from a third electronic device;
determining that the session of the network application is still associated with the second electronic device;
sending, to the third electronic device, an additional indication that the session of the network application is still associated with the second electronic device;
receiving, from at least one of the control device or the third electronic device, an additional request associated with not transferring the session of the network application from being associated with the second electronic device to being associated with the third electronic device; and
sending, to the third electronic device, fourth data representing one or more additional network applications.

14. The method as recited in claim 3, further comprising:
while the control device is associated with the first electronic device, receiving, from the control device, third data representing one or more first inputs;
generating the first data based at least in part on the third data;
while the control device is associated with the second electronic device, receiving, from the control device, fourth data representing one or more second inputs; and
generating the second data based at least in part on the fourth data.

15. The method as recited in claim 3, wherein:
associating the control device with the first electronic device causes one or more systems to update the session being provided by the first electronic device using one or more first inputs received by the control device; and
associating the control device with the second electronic device causes the one or more systems to update the session being provided by the second electronic device using one or more second inputs received by the control device.

16. A system comprising:
one or more processors; and
one or more computer-readable media storing instructions that, when executed by the one or more processors, cause the system to perform operations comprising:
generating session data, the session data comprising information associated with a session of a network application and user profile data comprising a first indicator associated with a control device;
causing the session to be associated with a first electronic device;
causing the control device to be associated with the first electronic device based on a second indicator associated with the session data and in response to the session being associated with the first electronic device;
receiving first data generated by the control device;
generating, based at least in part on the first data, second data representing a first state of the network application during the session;
sending the second data to the first electronic device;
receiving, from a second electronic device, a request to associate the session with the second electronic device, the request based at least in part on the user profile data being associated with the second electronic device;
determining to associate the session with the second electronic device;
based at least in part on determining to associate the session, causing the session to be associated with the second electronic device;
based on the session being associated with the second electronic device, the user profile data being associated with the second electronic device, and the second indicator being associated with the session data, causing the control device to be associated with the second electronic device;
receiving third data generated by the control;
generating, based at least in part on the third data, fourth data representing a second state of the network application during the session; and
sending the fourth data to the second electronic device.

17. The system as recited in claim 16, the operations further comprising:
sending, to the second electronic device, fifth data representing a user interface, the user interface including an indication that the session is associated with the first electronic device; and
receiving sixth data representing a request to associate the session with the second electronic device,
and wherein determining to associate the session is based at least in part on receiving the sixth data.

18. The system as recited in claim 16, the operations further comprising:
sending, to the second electronic device, fifth data representing a user interface, the user interface including an indication that the control device is associated with the first electronic device; and
receiving sixth data representing a request to associate the control device with the second electronic device,
and wherein causing the control device to be associated with the second electronic device is further based at least in part on receiving the sixth data.

19. The system as recited in claim 16, the operations further comprising:
receiving, from the first electronic device, fifth data associated with a user profile;
identifying the user profile based at least in part on the fifth data;
receiving, from the second electronic device, sixth data associated with the user profile;
identifying the user profile based at least in part on the sixth data; and
determining that the session is still associated with the first electronic device based at least in part on the user profile.

20. The system as recited in claim 16, the operations further comprising, based at least in part on determining to associate the session, causing the control device to no longer be associated with the first electronic device.

* * * * *